US012330306B2

(12) United States Patent
Madsen

(10) Patent No.: US 12,330,306 B2
(45) Date of Patent: Jun. 17, 2025

(54) OBTAINING THE GEAR STIFFNESS OF A ROBOT JOINT GEAR OF A ROBOT ARM

(71) Applicant: UNIVERSAL ROBOTS A/S, Odense S (DK)

(72) Inventor: Emil Madsen, Aarhus C (DK)

(73) Assignee: Universal Robots A/S, Odense S (DK)

(*) Notice: Subject to any disclaimer, the term of this patent is extended or adjusted under 35 U.S.C. 154(b) by 363 days.

(21) Appl. No.: 17/275,726

(22) PCT Filed: Sep. 10, 2019

(86) PCT No.: PCT/EP2019/074075
§ 371 (c)(1),
(2) Date: Mar. 12, 2021

(87) PCT Pub. No.: WO2020/053195
PCT Pub. Date: Mar. 19, 2020

(65) Prior Publication Data
US 2022/0105628 A1 Apr. 7, 2022

(30) Foreign Application Priority Data
Sep. 14, 2018 (EP) .................................. 18194683

(51) Int. Cl.
B25J 9/16 (2006.01)
B25J 13/08 (2006.01)
G05B 19/4155 (2006.01)

(52) U.S. Cl.
CPC ........... *B25J 9/1653* (2013.01); *B25J 9/1633* (2013.01); *B25J 9/1674* (2013.01); *B25J 13/088* (2013.01);
(Continued)

(58) Field of Classification Search
CPC ...... B25J 9/1653; B25J 9/1633; B25J 9/1674; B25J 13/088; B25J 9/1641;
(Continued)

(56) References Cited

U.S. PATENT DOCUMENTS 4,110,829 A 8/1978 Boys
8,614,559 B2 12/2013 Kassow et al.
(Continued)

FOREIGN PATENT DOCUMENTS

CN 106233214 A 12/2016
EP 1920892 A2 * 5/2008 ............ B25J 9/1602
(Continued)

OTHER PUBLICATIONS

Klimchik, 2018 IFAC "Robotic manipulators with double encoders: accuracy improvement based on advanced stiffness modeling and intelligent control".*

(Continued)

*Primary Examiner* — Adam R Mott
*Assistant Examiner* — Sagar Kc
(74) *Attorney, Agent, or Firm* — ArentFox Schiff LLP

(57) ABSTRACT

A method of obtaining the gear stiffness of a robot joint gear of a robot joint of a robot arm, where the robot joint is connectable to at least another robot joint. The robot joint comprises a joint motor having a motor axle configured to rotate an output axle via the robot joint gear. The method comprises the steps of: —applying a motor torque to the motor axle using the joint motor; —obtaining the angular position of the motor axle; —obtaining the angular position of the output axle; —determining the gear stiffness based on at least the angular position of the motor axle, the angular position of the output axle and a dynamic model of the robot arm.

18 Claims, 10 Drawing Sheets

(52) U.S. Cl.
CPC ............... *G05B 19/4155* (2013.01); *G05B 2219/40269* (2013.01)

(58) Field of Classification Search
CPC ...... G05B 19/4155; G05B 2219/40269; G05B 2219/37356; G05B 2219/39186; G05B 2219/40527
See application file for complete search history.

(56) References Cited

U.S. PATENT DOCUMENTS

| | | | |
|---|---|---|---|
| 9,248,573 | B2 | 2/2016 | Søe-Knudsen et al. |
| 9,833,897 | B2 | 12/2017 | Søe-Knudsen et al. |
| 10,081,102 | B1* | 9/2018 | Berkowitz ............ F16H 57/12 |
| 10,331,107 | B2 | 6/2019 | Moberg |
| 10,399,232 | B2 | 9/2019 | Oestergaard et al. |
| D895,704 | S | 9/2020 | Johansen |
| D895,705 | S | 9/2020 | Johansen |
| D895,706 | S | 9/2020 | Johansen |
| D898,090 | S | 10/2020 | Johansen |
| 10,850,393 | B2 | 12/2020 | Oestergaard et al. |
| D915,487 | S | 4/2021 | Sell |
| D924,228 | S | 7/2021 | Mirth |
| D932,485 | S | 10/2021 | Mirth |
| D932,486 | S | 10/2021 | Mirth |
| D932,487 | S | 10/2021 | Mirth |
| 2011/0204838 | A1* | 8/2011 | Nakasugi ............ B25J 9/1641 318/689 |
| 2012/0239198 | A1* | 9/2012 | Orita ............ B25J 9/1633 700/260 |
| 2013/0079928 | A1 | 3/2013 | Søe-Knudsen et al. |
| 2013/0255426 | A1 | 10/2013 | Kassow et al. |
| 2014/0379128 | A1 | 12/2014 | Ishikawa et al. |
| 2015/0039128 | A1 | 2/2015 | Oaki |
| 2015/0100065 | A1* | 4/2015 | Zinn ............ A61B 34/30 606/130 |
| 2016/0136805 | A1 | 5/2016 | Søe-Knudsen et al. |
| 2017/0057095 | A1 | 3/2017 | Oestergaard et al. |
| 2018/0178380 | A1 | 6/2018 | Oestergaard et al. |
| 2019/0086907 | A1 | 3/2019 | Oestergaard et al. |
| 2020/0171658 | A1 | 6/2020 | Thomsen |
| 2020/0180154 | A1* | 6/2020 | Tsuboi ............ B25J 9/10 |
| 2020/0340569 | A1 | 10/2020 | Johansen |
| 2020/0391393 | A1 | 12/2020 | Johansen |
| 2021/0039254 | A1 | 2/2021 | Oestergaard et al. |
| 2021/0086374 | A1 | 3/2021 | Brandt et al. |
| 2021/0237284 | A1 | 8/2021 | Vraa et al. |
| 2021/0260757 | A1 | 8/2021 | Nielsen et al. |
| 2021/0260759 | A1 | 8/2021 | Knudsen et al. |
| 2022/0226993 | A1 | 7/2022 | Madsen |
| 2023/0052996 | A1 | 2/2023 | Thomsen |

FOREIGN PATENT DOCUMENTS

| | | | | |
|---|---|---|---|---|
| EP | 2361736 | B1 | 8/2011 | |
| WO | WO-2016074708 | A1 * | 5/2016 | ............ B25J 17/00 |
| WO | WO-2016204099 | A1 * | 12/2016 | ............ B25J 13/084 |

OTHER PUBLICATIONS

Communication pursuant to Article 94(3) EPC for European Patent Application No. 19765727.3, issued Jun. 13, 2022, (12 Pages).
A. Klimchik et al: "Robotic manipulators with double encoders: accuracy improvement based on advanced stiffness modeling and intelligent control", IFAC—PAPERSONLINE—8TH IFAC Symposium on Advances in Automotive Control AAC 2016, Norrkoping, Sweden, Jun. 20-23, 2016, vol. 51, Jun. 11, 2018 (Jun. 11, 2018), pp. 740-745, XP055570706, ISSN: 2405-8963, DOI: 10.1016/j.ifacol.2018.08.407.
Bruno Siciliano et al: "Robotics—Dynamics—Chapter 7" In: "Robotics: Modelling, Planning and Control", Dec. 23, 2009 (Dec. 23, 2009), Springer, XP056611852.
Klimchik et al., "Robotic Manipulators with Double Encoders: Accuracy Improvement Based on Advanced Stiffness Modeling and Intelligent Control," IFAC—Papersonline—8th IFAC Symposium on Advances in Automotive Control AAC 2016, Norrkoping, Sweden, Jun. 20-23, 2016, vol. 51, Jun. 11, 2018 (Jun. 11, 2018), pp. 740-745, XP055570706, ISSN: 2405-8963, DOI: 10.1016/j.ifacol.2018.08.407.
International Preliminary Report on Patentability dated Mar. 9, 2021, International Application No. PCT/EP2019/074075 filed Sep. 10, 2019, (10 pgs.).
International Search Report dated Nov. 27, 2019, International Application No. PCT/EP2019/074075 filed Sep. 10, 2019, (4 pgs.).
Written Opinion of the International Searching Authority dated Nov. 27, 2019, International Application No. PCT/EP2019/074075 filed Sep. 10, 2019, (10 pgs.).
Office Action in Chinese Application No. 201980058114.2 dated Feb. 7, 2024 [with English translation], 22 pages.
Extended European Search Report in Application No. 18194683.1 dated Mar. 29, 2019, 9 pages.
Albu-Schäffer et al., "Parameter identification and passivity based joint control for a 7DOF torque controlled light weight robot," in Proc. of IEEE International Conference on Robotics & Automation (ICRA), Seoul, Korea, May 21-26, 2001, pp. 2852-2858, 7 pages.
Bittanti et al., "Convergence and Exponential Convergence of Identification Algorithms with Directional Forgetting Factor," Automatica, vol. 26, No. 5, pp. 929-932 (1990), 4 pages.
Bittanti et al., "Recursive Least-Squares Identification Algorithms with Incomplete Excitation: Convergence Analysis and Application to Adaptive Control," IEEE Trans. Automatic Control, vol. 35, No. 12, pp. 1371-1373 (1990), 3 pages.
Cirillo et al., "A mechatronic approach for robust stiffness estimation of variable stiffness actuators," in IEEE/ASME International Conference on Advanced Intelligent Mechatronics, Wollongong, Australia, Jul. 9-12, 2013, pp. 399-404, 6 pages.
Dumas et al., "Joint stiffness identification of six-revolute industrial serial robots," in Robotics and Computer-Integrated Manufacturing, vol. 27, No. 4, pp. 881-888 (2011), 15 pages.
Flacco et al., "A Pure Signal-Based Stiffness Estimation for VSA Devices," in Proc. of IEEE International Conference on Robotics & Automation (ICRA), Hong Kong, China, May 31-Jun. 7, 2014, pp. 2418-2423, 6 pages.
Flacco et al., "Residual-based Stiffness Estimation in Robots with Flexible Transmissions," in Proc. of IEEE International Conference on Robotics & Automation (ICRA), Shanghai, China, May 9-13, 2011, pp. 5541-5547, 7 pages.
Flacco et al., "Robust Estimation of Variable Stiffness in Flexible Joints," in Proc. of IEEE/RSJ International Conference on Intelligent Robots and Systems, San Francisco, Calif., USA, Sep. 25-30, 2011, pp. 4026-4033, 8 pages.
Gautier et al., "Dynamic Identification of flexible joint manipulators with an efficient closed loop output error method based on motor torque output data," in IEEE International Conference on Robotics and Automation (ICRA), Karlsruhe, Germany, May 6-10, 2013, pp. 2949-2955, 7 pages.
Grebenstein et al., "The DLR Hand Arm System," in Proc. of IEEE International Conference on Robotics & Automation (ICRA), Shanghai, China, May 9-13, 2011, pp. 3175-3182, 8 pages.
Jafari et al., "AwAS-II: A new Actuator with Adjustable Stiffness based on the novel principle of adaptable pivot point and variable lever ratio," in Proc. Of IEEE International Conference on Robotics & Automation (ICRA), Shanghai, China, May 9-13, 2011, pp. 4638-4643, 10 pages.
Johnson et al., "Life Test Failure of Harmonic Gears in a Two-Axis Gimbal for the Mars Reconnaissance Orbiter Spacecraft," Proceedings of the 38th Aerospace Mechanisms Symposium, Langley Research Center, May 17-19, 2006, 14 pages.
Jubien et al., "Joint Stiffness Identification of a Heavy Kuka Robot with a Low-cost Clamped Endeffect or Procedure," in Proc. of International Conference on Informatics in Control, Automation and Robotics (!CINCO), Vienna, Austria, Sep. 1-3, 2014, pp. 585-591, 9 pages.

(56) References Cited

OTHER PUBLICATIONS

Lampaert et al., "A Generalized Maxwell-Slip Friction Model appropriate for Control Purposes," in IEEE International Conference for Physics and Control, St. Petersburg, Russia, Proceedings, pp. 1170-1177, (2003), 8 pages.
Menard et al., "A real time robust observer for an Agonist-Antagonist Variable Stiffness Actuator," in Proc. of IEEE International Conference on Robotics & Automation (ICRA), Karlsruhe, Germany, May 6-10, 2013, pp. 3988-3993, 7 pages.
Mobley et al., "Harmonic Drive™ Gear Material Selection and Life Testing," Proceedings of the 41thAerospace Mechanisms Symposium, Jet Propulsion Laboratory, May 16-18, 2012, 14 pages.
Östring et al., "Closed-loop identification of an industrial robot containing flexibilities," in Control Engineering Practice, vol. 11, pp. 291-300 (2003), 17 pages.
Pham et al., "Identification of joint stiffness with bandpass filtering," in Proc. of IEEE International Conference on Robotics & Automation (ICRA), Seoul, Korea, May 21-26, 2001, pp. 2867-2872, 6 pages.
Nye, T. W., "Harmonic Drives: Determining Wear Life Based on Stiffness Considerations," in Proc. of the International Power Transmission and Gearing Conference, vol. 2 (pp. 867-877). Chicago, USA: American Society of Mechanical Engineers, Apr. 25-28, 1989, 11 pages.
Spong, M. W., "Modeling and Control of Elastic Joint Robots," Journal of Dynamic Systems, Measurement, and Control, vol. 109, No. 4, 1987, pp. 310-319, 10 pages.
Madsen et al., Model-bsed on-line estimation of time-varying nonlinear joint stiffness on an e-series universal robots manipulator. 2019 International Conference on Robotics and Automation (ICRA), Montreal, QC, Canada, 2019, pp. 8408-8414.
File History of EP3849753 downloaded Dec. 5, 2024 (321 pages).
File History of EP 3623113 downloaded Dec. 5, 2024 (78 pages).
Dhaouadi et al., "A new dynamic model of hysteresis in harmonic drives," in IEEE Transactions on Industrial Electronics, vol. 50, No. 6, pp. 1165-1171, Dec. 2003.
Tjahjowidodo et al., Theoretical modelling and experimental identification of nonlinear torsional behaviour in harmonic drives. Mechatronics. Aug. 2013; 23(5): 497-504.
European Examination Report in Application 19765727.3 mailed on Nov. 29, 2024, 5 pages.

* cited by examiner

OBTAINING THE GEAR STIFFNESS OF A ROBOT JOINT GEAR OF A ROBOT ARM

This application is a U.S. national stage entry of PCT application no. PCT/EP2019/074075 which was filed on Sep. 10, 2019. PCT application no. PCT/EP2019/074075 claims priority to European application no. 18194683.1 which was filed on Sep. 14, 2018. This application claims priority to both PCT application no. PCT/EP2019/074075 and to European application no. 18194683.1. Both PCT application no. PCT/EP2019/074075 and European application no. 18194683.1 are incorporated into this this application by reference.

FIELD OF THE INVENTION

The present invention relates to robot joint gears for robot arms comprising a plurality of robot joints connecting a robot base and a robot tool flange.

BACKGROUND OF THE INVENTION

Robot arms comprising a plurality of robot joints and links where motors can rotate the joints in relation to each other are known in the field of robotics. Typically, the robot arm comprises a robot base which serves as a mounting base for the robot arm and a robot tool flange where to various tools can be attached. A robot controller is configured to control the robot joints to move the robot tool flange in relation to the base. For instance, in order to instruct the robot arm to carry out a number of working instructions.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a geometric relationship between the different parts of the robot arm and may comprise information of the robot arm such as, length, size of the joints and links and can for instance be described by Denavit-Hartenberg parameters or the like. The dynamic model makes it possible for the controller to determine which torques the joint motors shall provide in order to move the robot joints for instance at specified velocity, acceleration or in order to hold the robot arm in a static posture.

On many robot arms it is possible to attach various end effectors to the robot tool flange, such as grippers, vacuum grippers, magnetic grippers, screwing machines, welding equipment, dispensing systems, visual systems etc.

In some robots the robot joint comprises a joint motor having a motor axle configured to rotate an output axle via a robot joint gear. Typically, the output axle is connected to and configured to rotate parts of the robot arm in relation to each other. The robot joint gear forms a transmission system configured to transmit torque provided by the motor axle to the output axle for instance to provide a gear ratio between the motor axle and the output axle. The robot joint gear can for instance be provided as a spur gears, planetary gears, bevel gears, worm gears, strain wave gears or other kind of transmission systems. Commonly flexibility exist in the transmissions used for industrial robots due to the elasticity various type of transmissions. This flexibility may lead to an undesired dynamic time-varying displacement between the position of parts of the robot arm.

Taking into account the gear flexibility in the dynamic model makes the dynamic model more accurately resemble the dynamics of the real robot arm because the robot joint torque originating from the gear deformation can be known. A more accurate dynamic model can for instance allow the robot controller to control the robot arm with greater accuracy and precision. A more accurate dynamic model can also allow the robot controller to more accurately identify external disturbances, for instance human interference which is of great concern in terms of safety.

Research have been devoted to accurately identify the dynamic characteristics of the robot gear systems. However, one practical issue when taking into account the joint stiffness in the robot controller design is that the joint stiffness changes with wear due to material being worn off at the gear meshing [1], [2], [3].

Estimating the joint stiffness on industrial robots have been accomplished through off-line identification procedures by several researchers. Off-line identification procedures are not well suited for solving the problem of time-varying joint stiffness. Such procedures would have to be re-run from time to time to keep the joint stiffness information up to date. While the off-line identification procedure is running the robot is unable to conduct any other task with clear negative consequences to the user. Despite the shortcomings of the off-line calibration procedures for joint stiffness estimation a number of references will be given to such off-line identification procedures applied to solve the robot joint stiffness estimation problem. For the off-line identification of joint stiffness, one method is to apply external excitation on one robot joint at a time resulting in a reduced dynamic model hence easier identification as in [4], [5], [6], [7].

Another option is to evaluate joint stiffness values using an external laser-tracking sensor system to visually track the end effector displacements for a given applied wrench as in [8] and [9], where the applied wrench is equal to the applied forced and torques at the end effector. A third option is to incorporate two absolute position rotary encoders in the robot joint to enable direct measurement of the joint deflection and then manually impose a known force at the end-effector and using the kinematic model (the Jacobian) of the robot arm to calculate the joint torques as in [9]. Such procedure however requires external and known loading of the end-effector and the robot is not allowed to move during the procedure. A fourth option is to estimate the joint stiffness using a so-called locked-link joint procedure as in [10] where the end-effector is clamped to the environment and using either motor positions measurement and motor torques data or a force/torque sensor to measure the external wrench between the clamped end effector and the environment.

Very few works are available on the on-line estimation of time-varying nonlinear stiffness e.g. AwAs-II joint [11]. These works are focused towards Variable Stiffness Actuators (VSAs) as found in in the DLR Hand Arm System [12] by the DLR Institute of Robotics and Mechatronics, however most industrial robots do not comprise a VSA. In 2011, Flacco and De Luca [13] estimated the nonlinear stiffness of robot joints using only a motor position sensor by computing a dynamic residual based on the generalized momentum followed by a least squares algorithm to estimate the stiffness parameters.

Robustness issues were later addressed in [14] by introducing a kinematic Kalman filter to handle discretization and quantization errors and a modified recursive least squares algorithm was used to better handle poor excitation conditions. The stiffness parameters were however assumed time-invariant. Further refinements of their method were carried out in [15] modifying the stiffness estimation algorithm to deal with time-varying stiffness by using a Recursive Least Squares method based on a QR decomposition (QR-RLS) able to handle time-varying stiffness characteristics. A non-causal Savitzky-Golay (SG) filter was used to remove noise on the input/output signals. No experiments did however support their findings.

In May 2013, Menard et al. [16] developed an observer capable of on-line estimating the time-varying stiffness of a VSA. Experimental analysis on the VSA system revealed parameter uncertainties of up to 25% of the true stiffness. Friction was assumed purely viscous with a single constant coefficient. Such friction model is not capable of accurately describing real frictional characteristics of most electromechanical systems, as well-known frictional characteristics such as Coulomb friction and the Stribeck effect is then neglected completely.

In July 2013, Cirillo et al. [17] demonstrated online stiffness estimation of a VSA by measuring the elastic energy using an optoelectronic sensor built into the robot joint.

SUMMARY OF THE INVENTION

The objective of the present invention is to address the above described limitations with the prior art or other problems of the prior art. This is achieved by a method of obtaining the gear stiffness of a robot joint gear as defined by the independent claim. The dependent claims describe possible embodiments of the method according to the present invention. The advantages and benefits of the present invention are described in the detailed description of the invention. Further the objective of the present invention is addressed by a method of controlling a robot arm based on the obtained gear stiffness and a robot arm with a controller configured to control the robot arm based on the obtained gear stiffness.

A robot controller taking into account the joint flexibilities may perform well right after calibration but for a good performance over the lifetime of the robot, the joint stiffness must be estimated on-line. Further, estimating the joint stiffness on-line will allow for predictive maintenance in the case of gear unit failure. In most cases, no sensor is available for directly measuring the joint stiffness, so the stiffness information is collected by combining an accurate model of the flexibility torque with the measurements available, such as position and force/torque sensor measures, either implemented in the robot or by using external hardware.

The invention provides a simple method of obtaining the gear stiffness of a robot joint gear of a robot arm without the need to integrate expensive force/torque sensors, as the joint gear stiffness of the robot joint gear can be determined based on sensors commonly used in industrial robots, which also makes it possible to integrate such method into existing industrial robots having such sensors. Additionally, the gear stiffness can be obtained online during use of the robot and thus used as an input to the dynamic model controlling the robot whereby a more accurate controlling of the robot can be provided. Consequently, vibrations and inaccuracies of the robot's movements due to gear stiffness can be accounted for when controlling the robot. Additionally, the gear stiffness changes over time primarily due to wear of the robot joint gear and obtaining the gear stiffness online makes it possible to control the robots based on changes of gear stiffness whereby the accuracy of the robot over time is maintained/improved. Further obtaining the gear stiffness online over time makes it possible to predict failure of the robot joint gear as the gear stiffness can be used to indicate when the robot joint gear is about to fail. Consequently, the robot joint gear can be sent to service in order to exchange/repair the robot joint gear whereby unplanned downtime of the robot can be reduced.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
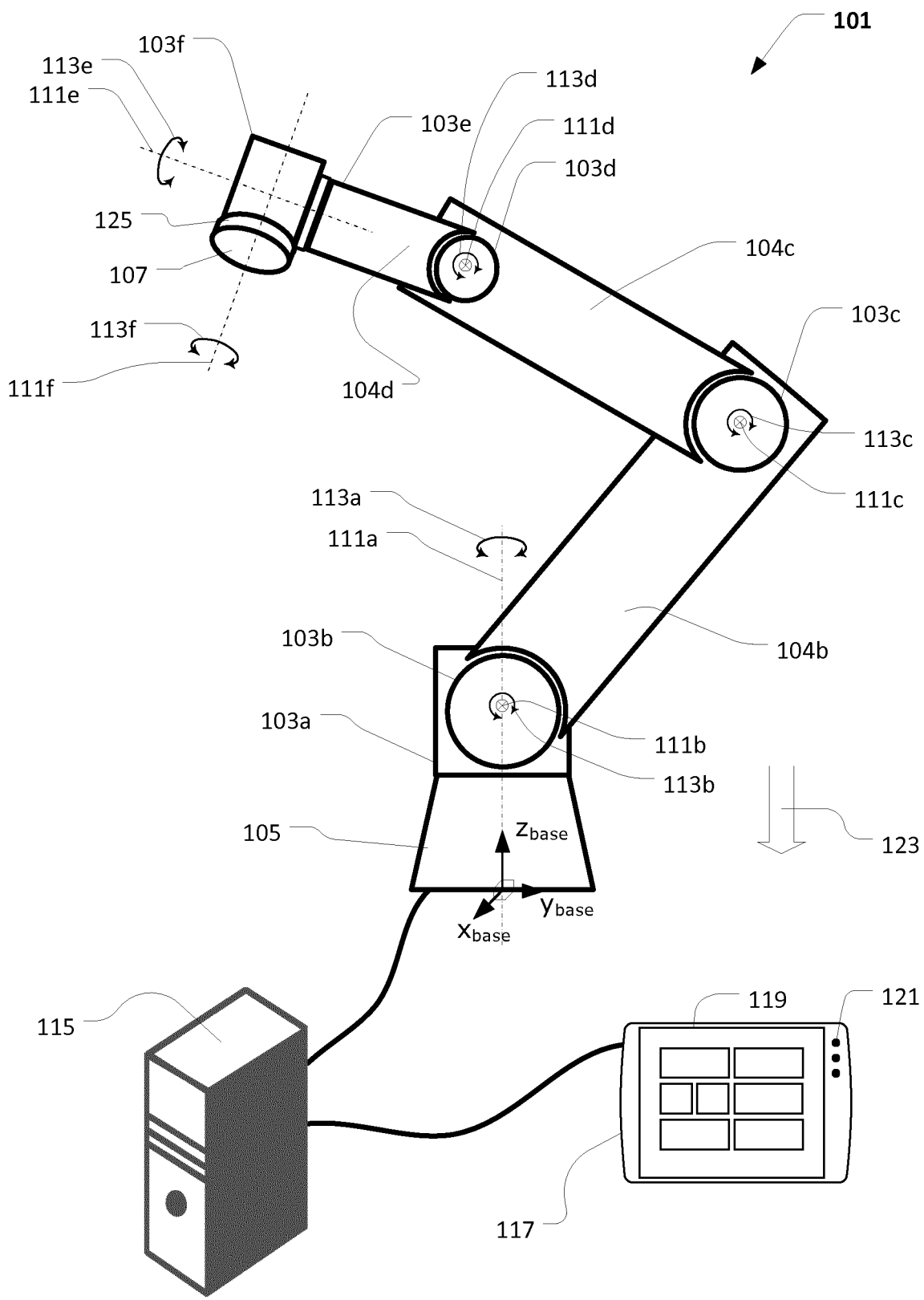
FIG. 1 illustrates a robot arm configured to obtain the gear stiffness of the robot joint gears.

The invention can be embodied into a robot arm and is described in view of the robot arm illustrated in FIG. 1. The robot arm 101 comprises a plurality of robot joints 103a, 103b, 103c, 103d, 103e, 103f and robot links 104b, 104c, 104d connecting a robot base 105 and a robot tool flange 107. A base joint 103a is connected directly with a shoulder joint and is configured to rotate the robot arm around a base axis 111a (illustrated by a dashed dotted line) as illustrated by rotation arrow 113a. The shoulder joint 103b is connected to an elbow joint 103c via a robot link 104b and is configured to rotate the robot arm around a shoulder axis 111b (illustrated as a cross indicating the axis) as illustrated by rotation arrow 113b. The elbow joint 103c connected to a first wrist joint 103d via a robot link 104c and is configured to rotate the robot arm around an elbow axis 111c (illustrated as a cross indicating the axis) as illustrated by rotation arrow 113c. The first wrist joint 103d connected to a second wrist joint 103e via a robot link 104d and is configured to rotate the robot arm around a first wrist axis 111d (illustrated as a cross indicating the axis) as illustrated by rotation arrow 113d. The second wrist joint 103e is connected to a robot tool joint 103f and is configured to rotate the robot arm around a second wrist axis 111e (illustrated by a dashed dotted line) as illustrate by rotation arrow 113e. The robot tool joint 103f comprising the robot tool flange 107, which is rotatable around a tool axis 111f (illustrated by a dashed dotted line) as illustrated by rotation arrow 113f. The illustrated robot arm is thus a six-axis robot arm with six degrees of freedom, however it is noticed that the present invention can be provided in robot arms comprising less or more robot joints, and the robot joints can be connected directly to the neighbor robot joint or via a robot link. It is to be understood that the robot joints can be identical and/or different and that the robot joint gear may be omitted in some of the robot joints. The direction of gravity 123 is also indicated in the figure.

The robot arm comprises at least one robot controller 115 configured to control the robot joints by controlling the motor torque provided to the joint motors based on a dynamic model of the robot. The robot controller 115 can be provided as a computer comprising an interface device 117 enabling a user to control and program the robot arm. The controller can be provided as an external device as illustrated in FIG. 1 or as a device integrated into the robot arm. The interface device can for instance be provided as a teach pendent as known from the field of industrial robots which can communicate with the controller via wired or wireless communication protocols. The interface device can for instance comprise a display 119 and a number of input devices 121 such as buttons, sliders, touchpads, joysticks, track balls, gesture recognition devices, keyboards etc. The display may be provided as a touch screen acting both as display and input device.

Figure 2:
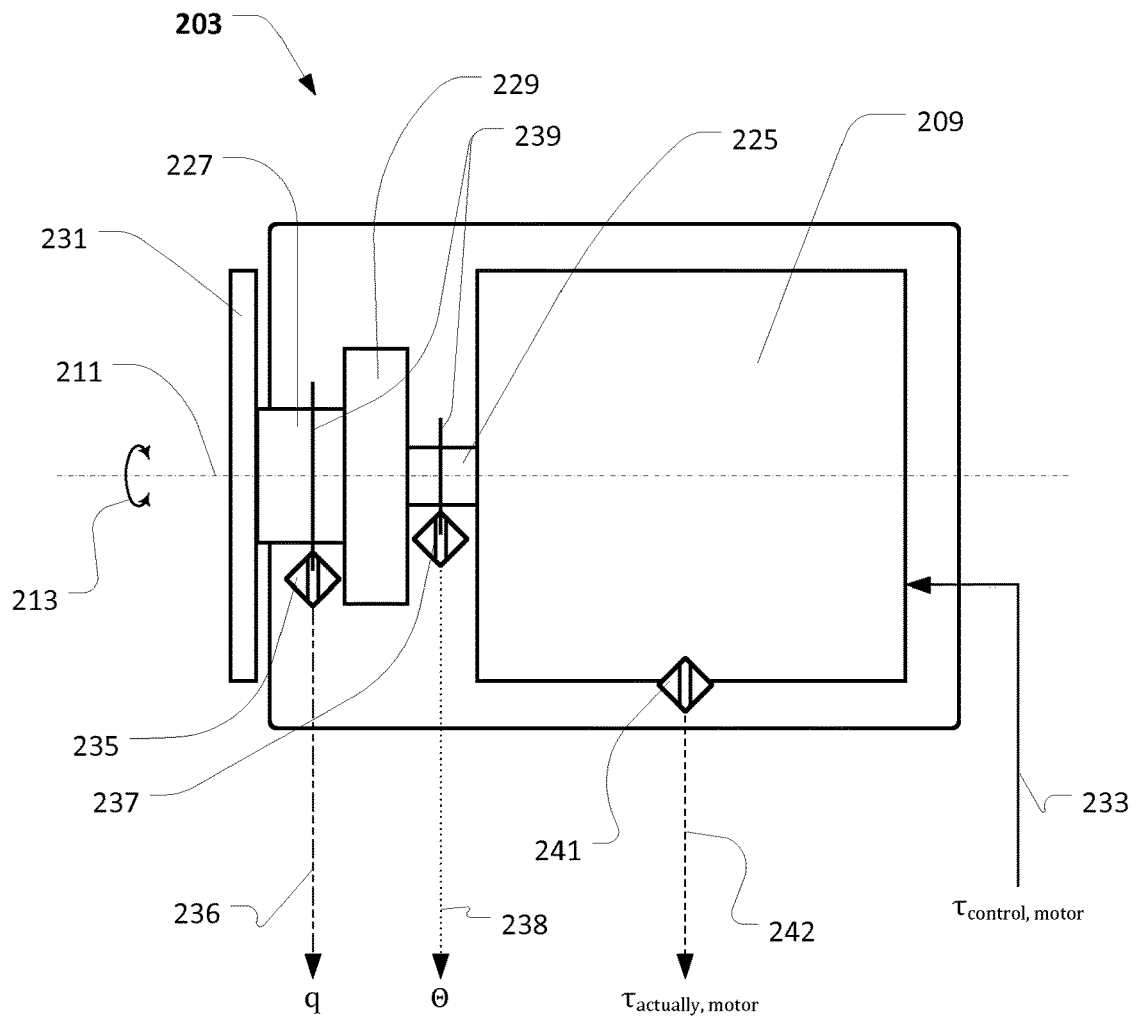
FIG. 2 illustrates a schematic cross-sectional view of a robot joint.

FIG. 2 illustrates a schematic cross-sectional view of a robot joint 203. The schematic robot joint 203 can reflect any of the robot joints 103a-103f of the robot 101 of FIG. 1. The robot joint comprises a joint motor 209 having a motor axle 225. The motor axle 225 is configured to rotate an output axle 227 via a robot joint gear 229. The output axle 227 rotates around an axis of rotation 211 (illustrated by a dot-dash line) and can be connected to a neighbor part (not shown) of the robot. Consequently, the neighbor part of the robot can rotate in relation to the robot joint 203 around the axis of rotation 211 as illustrated by rotation arrow 213. In the illustrated embodiment the robot joint comprises an output flange 231 connected to the output axle and the output flange can be connected to a neighbor robot joint or an arm section of the robot arm. However, the output axle can be directly connected to the neighbor part of the robot or by any other way enabling rotation of the neighbor part of the robot by the output axle.

The joint motor is configured to rotate the motor axle by applying a motor torque to the motor axle as known in the art of motor control, for instance based on a motor control signal 233 indicating the torque, $\tau_{control,\ motor}$, applied by said motor axle.

The robot joint gear 229 forms a transmission system configured to transmit the torque provided by the motor axle to the output axle for instance to provide a gear ratio between the motor axle and the output axle. The robot joint gear can for instance be provided as spur gears, planetary gears, bevel gears, worm gears, strain wave gears or other kind of transmission systems. The robot joint comprises at least one joint sensor providing a sensor signal indicative of at least the angular position, q, of the output axle and an angular position, $\Theta$, of the motor axle. For instance, the angular position of the output axle can be indicated by an output encoder 235, which provide an output encoder signal 236 indicating the angular position of the output axle in relation to the robot joint. Similarly, the angular position of the motor axle can be provided by an input encoder 237 providing an input encoder signal 238 indicating the angular position of the motor axle in relation to the robot joint. The output encoder 235 and the input encoder 237 can be any encoder capable of indicating the angular position, velocity and/or acceleration of respectively the output axle and the motor axle. The output/input encoders can for instance be configured to obtain the position of the respective axle based on the position of an encoder wheel 239 arrange on the respective axle. The encoder wheels can for instance be optical or magnetic encoder wheels as known in the art of rotary encoders. The output encoder indicating the angular position of the output axle and the input encoder indicating the angular position of the motor axle makes it possible to determine a relationship between the input side (motor axle) and the output side (output axle) of the robot joint gear.

The robot joints may optionally comprise one or more motor torque sensors 241 providing a motor torque signal 242 indicating the torque provided by the motor axle. For instance, the motor torque sensor can be provided as current sensors obtaining the current through the coils of the joint motor whereby the motor torque can be determined as known in the art of motor control. For instance, in connection with a multiphase motor, a plurality of current sensors can be provided in order to obtain the current through each of the phases of the multiphase motor and the motor torque can then be obtained based on the quadrature current obtained from the phase currents through a Park Transformation. Alternatively, the motor torque can be obtained using other kind of sensors for instance force-torque sensors, strain gauges etc.

Figure 3:
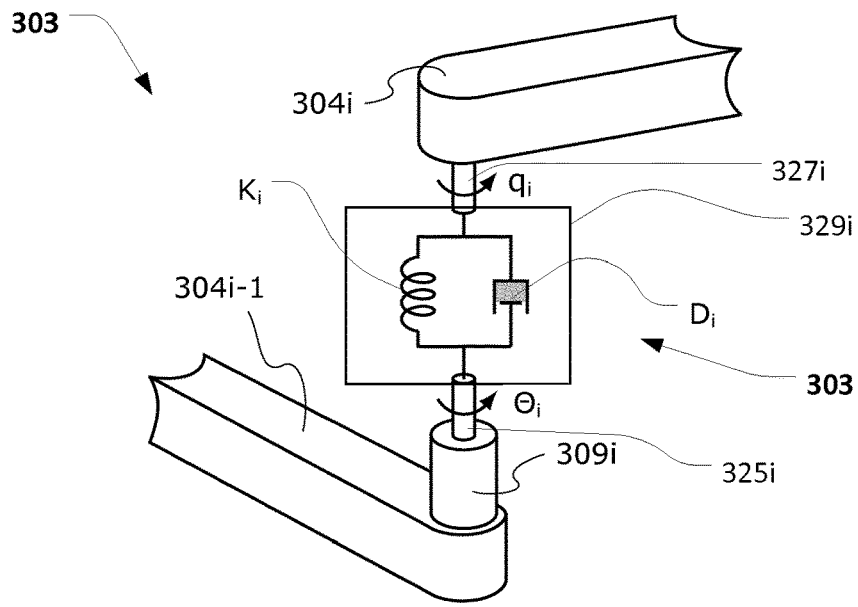
FIG. 3 illustrates a model of a robot joint gear.

FIG. 3 illustrates a model of a robot joint 303 connecting robot link 304i-1 and robot link 304i, where the joint motor 309i is arranged on robot link 304i-1 and rotates robot link 304i in relation to robot link 304i-1. The motor axle 325i of the joint motor is connected to an output axle 327i via robot joint gear 329i (illustrated in schematic form) and the robot link 304i rotates together with the output axle 327i. The robot joint gear provides a gear ratio between the motor axle and the output axle and in an ideal gear the rotation of the motor axle is immediately transformed into rotation of the output axle according to the gear ratio of the robot joint gear. However as described in the background of the invention flexibility exist in the types of robot joint gears used in the field of robot arms. The flexibility of a robot joint gear can be indicated by the gear stiffness of the robot joint gear which defines a relationship between torque through the robot joint gear and the deformation between the input side (motor axle) and the output side (output axle) of the robot joint gear. The flexibility of a robot joint gear can be represented as a spring 326 and a damper 328 coupled in parallel between the input side (motor axle) and the output side (output axle) of the robot joint gear. The spring constant $K_i$ of the spring indicates the gear stiffness of the robot joint gear and the damping constant of the damper $D_i$ indicates the damping of the robot joint gear. As described in the background of the invention the gear stiffness and damping of the robot joint gear can vary; consequently, $K_i$ and $D_i$ need not to be constants.

The non-infinite gear stiffness of the robot joint results in a deflection between the input side and the output side of the robot joint gear when a torque is applied to the robot joint gear. The deflection of the robot joint gear can be indicated by a deflection variable indicating the differences between the angular position $\Theta$ of the motor axle and the angular position q of the of the output axle, thus the deflection variable is defined as:

$$\Phi_{joint,i} = \Theta_i - q_i \quad \text{eq. 1}$$

The joint transmission torque $\tau_{joint,i}$ defines the torque that is transferred from the motor axle to the output axle via the robot joint gear and can be modeled as a function of the deflection variable $\Phi_{joint}$ and its time-derivative:

$$\tau_{joint,i}(\Phi_{joint,i}, \dot{\Phi}_{joint,i}) = \tau_{E,i}(\Phi_{joint,i}) + \tau_{D,i}(\dot{\Phi}_{joint,i}) \quad \text{eq. 2}$$

where $\tau_{E,i}(\Phi_{joint,i})$ is a flexibility torque depending on the gear stiffness $K_i$ and the deflection of the robot joint gear and $\tau_{D,i}(\dot{\Phi}_{joint,i})$ is damping torque depending on the damping coefficient $D_i$ and the first time derivative of the deflection of the robot joint gear and the time derivative of the deflection of the robot joint gear.

The $\tau_{D,i}(\dot{\Phi}_{joint,i})$ damping torque of the robot joint gear can for instance be obtained by following the steps:

Fix the output axle of the robot joint gear;
Apply a torque to the motor axle of the robot joint gear to yield a gear deflection;
Keep the motor axle of the robot joint gear still and remove the applied torque from the motor axle of the robot joint gear;
Observe the position of the motor axle of the robot joint gear over time as the motor axle of the robot joint gear undergoes a damped harmonic motion with an amplitude that decreases over time;
The damping torque is a measure of the energy dissipation during the motion. Assuming an underdamped harmonic motion, the damping coefficient $D_i$ can be obtained as:

$$D_i = \frac{-2B\log_e\left(\frac{A_2}{A_1}\right)}{t_2 - t_1} \quad \text{eq. 3}$$

where B is the mass moment of inertia of the motor axle, $A_1$ and $A_2$ are, respectively, amplitudes of the first and second vibration, and $t_1$ and $t_2$ are, respectively, times for the first and second motion.

If the motion is not underdamped, a larger mass moment of inertia is added to the input axle.

The gear stiffness $K_i$ of the robot joint gear can be characterized by how much the flexible torque $\tau_E$ causing the gear deflection changes as a function of the gear deflection. The gear stiffness can thus be expressed as:

$$K_i(\Phi_{joint,i}) = \frac{\delta \tau_E(\Phi_{joint,i})}{\delta \Phi_{joint,i}} \approx \frac{\Delta \tau_E(\Phi_{joint,i})}{\Delta \Phi_{joint,i}} \quad \text{eq. 4}$$

Assuming that that no flexibility torque exists for the undeformed transmission and that the transmission has the same behavior in compression and extension, thus:

$$\tau_{E,i}(0) = 0 \; \forall \Phi_{joint,i} \quad \text{eq. 5}$$

$$\tau_{E,i}(-\Phi_{joint,i}) = -\tau_E(\Phi_{joint,i}) \; \forall \Phi_{joint,i} \quad \text{eq. 6}$$

Figure 4:
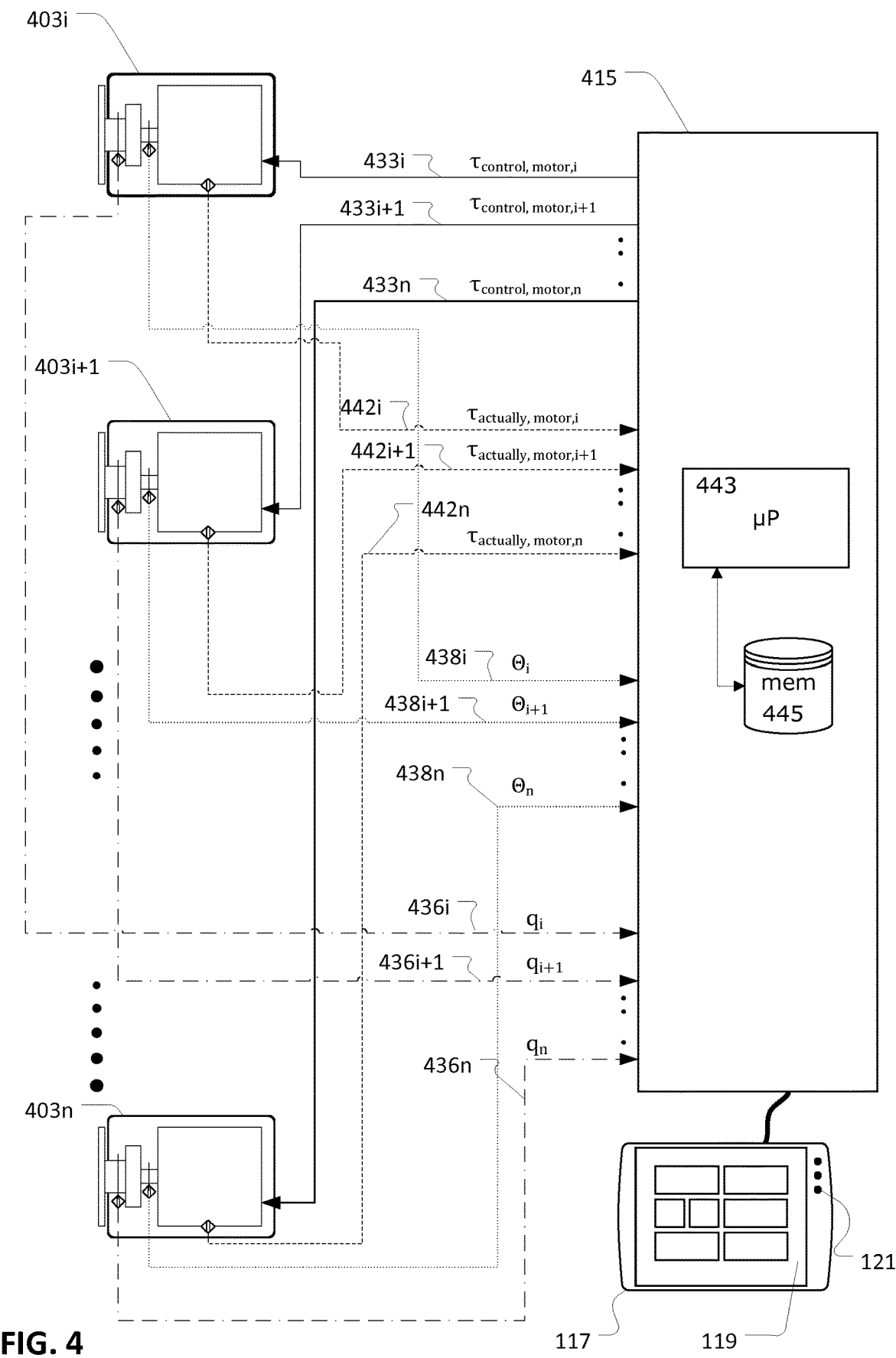
FIG. 4 illustrates a simplified structural diagram of a robot arm.

FIG. 4 illustrates a simplified structural diagram of a robot arm comprising a plurality of n number of robot joints 403$i$, 403$i$+1 . . . 403$n$. The robot arm can for instance be embodied like the robot arm illustrated in FIG. 1 with a plurality of interconnected robot joints, where the robot joints can be embodied like the robot joint illustrated in FIG. 2. It is to be understood that some of the robot joints and robot links between the robot joints have been omitted for sake of simplicity. The controller is connected to an interface device comprising a display 119 and a number of input devices 121, as described in connection with FIG. 1. The controller 415 comprises a processor 443, a memory 445 and at least one input and/or output port enabling communication with at least one peripheral device.

The controller is configured to control the joint motors of the robot joints by providing motor control signals to the joint motors. The motor control signals 433$i$, 433$i$+1 . . . 433$n$ are indicative of the motor torque $\tau_{control,motor,i}$, $\tau_{control,motor,i+1}$, and $\tau_{control,motor,n}$ that each joint motor shall provide by the motor axles. The motor control signals can indicate the desired motor torque, the desired torque provided by the output axle, the currents provided by the motor coils or any other signal from which the motor torque can be obtained. The motor torque signals can be sent to a motor control driver (not shown) configured to drive the motor joint with the motor current resulting in the desired motor torque. The robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement and/or be arranged in a static posture. The dynamic model of the robot arm can be stored in the memory 445.

As described in connection with FIG. 2 the robot joints comprise an output encoder providing output encoder signals 436$i$, 436$i$+1 . . . 436$n$ indicating the angular position $q_{,i}$, $q_{,i+1}$ . . . $q_{,n}$ of the output axle in relation to the respective robot joint; an input encoder providing an input encoder signal 438$i$, 438$i$+1 . . . 438$n$ indicating the angular position of the motor axle $\Theta_{,i}$, $\Theta_{,i+1}$ . . . $\Theta_{,n}$ in relation to the respective robot joint and a motor torque sensor providing a motor torque signal 442$i$, 442$i$+1 . . . 442$n$ indicating the torque $\tau_{actually,motor,i}$, $\tau_{actually,motor,i+1}$, $\tau_{actually,motor,n}$, provided by the motor axle of the respective robot joint. The controller is configured to receive the output encoder signal 436$i$, 436$i$+1 . . . 436$n$, the input encoder signal 438$i$, 438$i$+1 . . . 438$n$ and the motor torque signals 442$i$, 442$i$+1 . . . 442$n$.

The controller is further configured to obtain the gear stiffness of at least one of the robot joint gears of the robot joints of the robot arm by:

applying a motor torque to the motor axle of the at least one robot joint using the joint motor;
obtaining the angular position of the motor axle of the robot joint;
obtaining the angular position of the output axle of the robot joint;

and determining the gear stiffness based on the motor torque applied to the motor axle, the angular position of the motor axle, the angular position of the output axle and the dynamic model of the robot arm.

Figure 5:
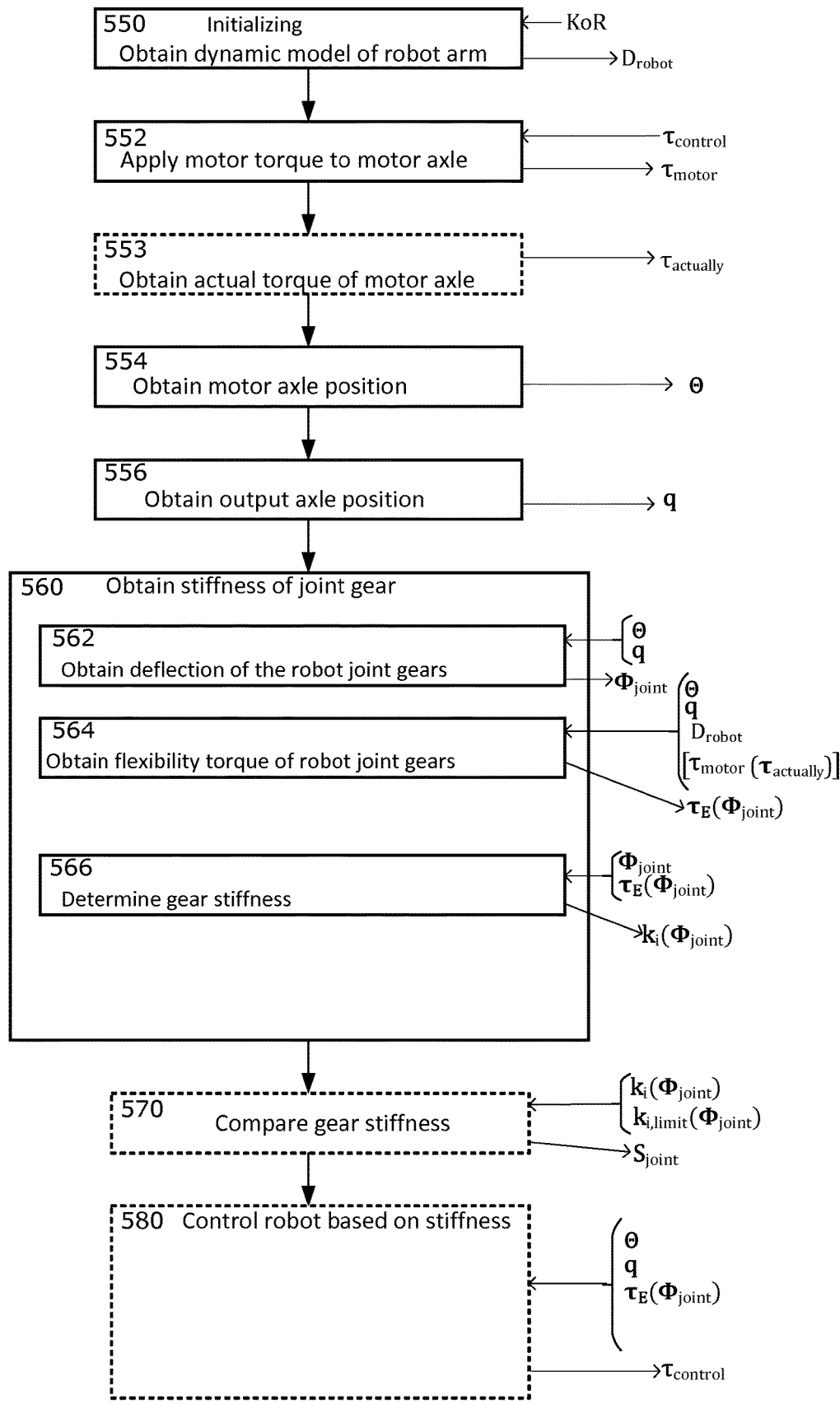
FIG. 5 illustrates a flow chart of a method of obtaining the gear stiffness of a robot joint gear of a robot joint of a robot arm.
Figure 6:
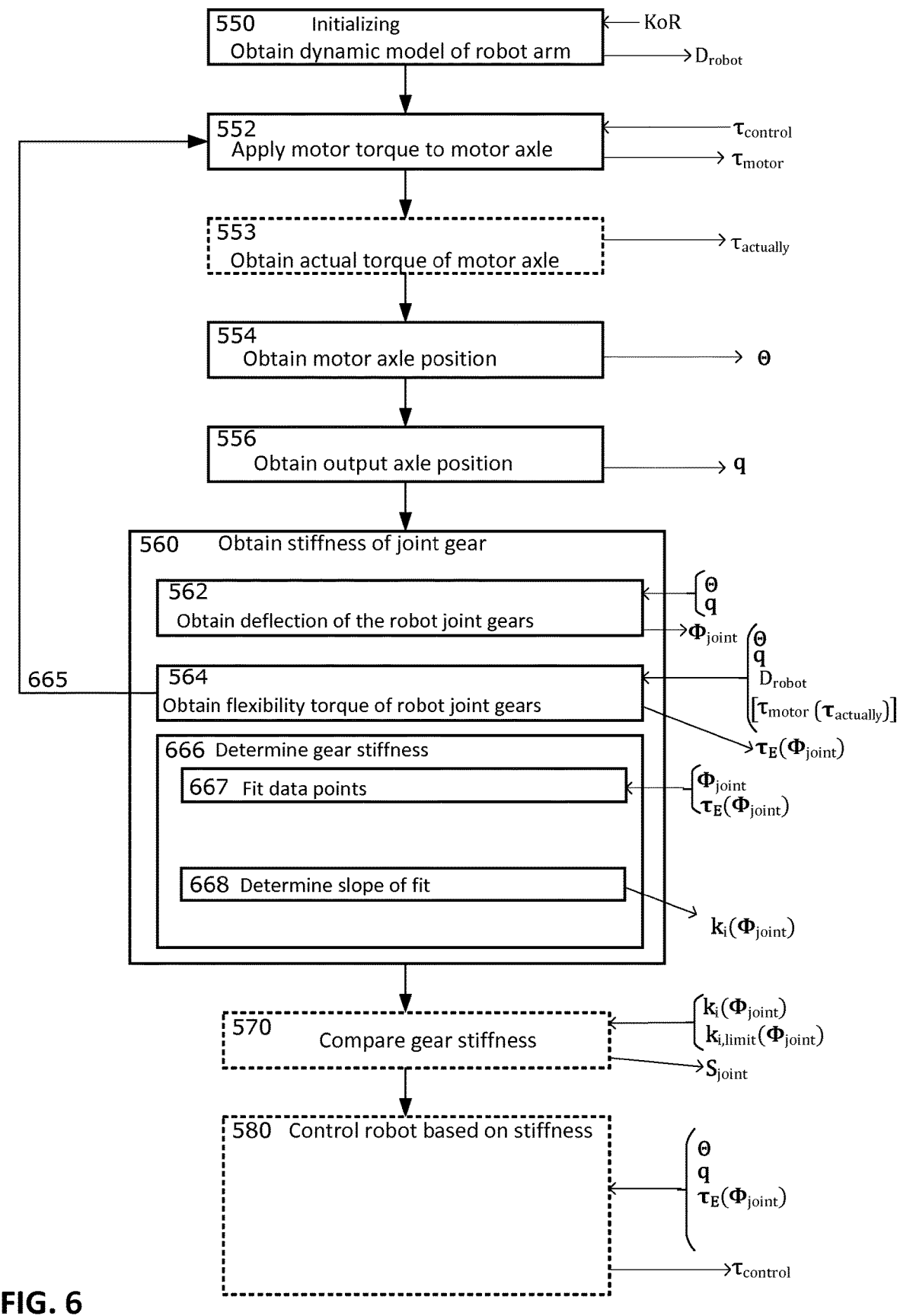
FIG. 6 illustrates a flow chart of another method of obtaining the gear stiffness of a robot joint gear of a robot joint of a robot arm.

The controller can for instance be configured to carry out the method of obtaining the gear stiffness of a robot joint gear obtained by the method illustrated in FIGS. 5-6 and described in following paragraphs [0034]-[0066].

FIG. 5 illustrates a flow chart of a method of obtaining the gear stiffness of a robot joint gear of a robot joint of a robot arm, where the robot joint is connectable to at least another robot joint and where the robot joint comprises a joint motor having a motor axle configured to rotate an output axle via the robot joint gear. The method can for instance be used to obtain the gear stiffness of the joint gears of the robot arm illustrated in FIGS. 1-4 and the method is described in view of the robot arm illustrated in FIGS. 1-4. It is noted that the method in the following is described in view of a method where the gear stiffness of all the robot joint gears of the robot arm are obtained, however it is to be understood that the method can be used to obtain the gear stiffness of a single robot joint gear or some of the robot joint gears.

The method comprises a step of initializing 550, a step 552 of applying a motor torque to the motor axles of the joint motors; a step 554 of obtaining the angular position of the motor axles of the joint motors; a step 556 of obtaining the angular position of the output axle of the robot joint gears and a step 560 of determining the gear stiffness of the robot joint gears based on the motor torques applied to the motor axles, the obtained angular positions of the motor axles, the obtained angular positions of the output axles and the dynamic model of the robot arm.

Step of initializing 550 comprises a step of obtaining the dynamic model $D_{robot}$ of the robot arm and can be based on prior knowledge of the robot arm and robot joints, KoR [Knowledge of Robot], such as the dimensions and weight of robot joints and robot links; joint motor properties; information relating to an eventual payload attached to the robot arm, orientation of the robot arm in relation to gravity and frictional properties of the robot arm and robot joints.

The dynamic model of the robot arm can be defined and pre-stored in the memory of the controller and the user can in some embodiment be allowed to modify the dynamic model op the robot arm, for instance by providing payload information of a payload attached to the robot arm or defining the orientation of the robot arm in relation to gravity.

The dynamic model of the robot arm can be obtained by considering the robot arm as an open kinematic chain having a plurality of (n+1) rigid robot links and a plurality of n revolute robot joints, comprising a joint motor configured to rotate at least one robot link. In this example the dynamic model is provided by making the following assumptions:
A1: The rotors of the joint motors are uniform bodies having their center of mass at the axis of rotation (motor axle);
A2: The joint motors are located on the robot links preceding the driven robot links; and
A3: The angular velocity of the rotors of the joint motors are due to their own spinning.
Assumption A1 is a basic requirement for long life of a joint motor such as electric motors and also implies that the dynamics of the robot joint will be independent of the angular position of the motor axle. The kinematic arrangement of joint motors and robot links described in assumption A2 is illustrated in FIG. 3. It is to be understood that the assumption A2 may not be physically true when comparing with an actual robot where joint motor driving the robot links can be arrange at other positions of the robot arm, however there exist always a theoretical equivalent to this assumption. Assumption A3 is reasonable in connection with robot joint gears having large reduction ratios [18] typical in the order of 50-200, or more specific in the order of 100-150. The assumptions are equivalent to neglecting energy contributions due to the inertial couplings between the joint motor and the robot links and also implies that Coriolis and centripetal terms become independent of the rotor's angular velocity.

The configuration of robot arm can be characterized by the generalized coordinates $(q\ \Theta) \in \mathbb{R}^{2N}$ where q is a vector comprising the angular position of the output axles of the robot joint gears and $\Theta$ is a vector comprising the angular position of the motor axles as seen in "space" of the output side of the robot joint gear. Consequently:

$$\Theta = \frac{\Theta_{real}}{r}$$

where $\Theta_{real}$ is the real angular position of the motor axle (e.g. as measured by an encoder) and r the gear ratio of the robot joint gear. This is the notation used throughout this application.

Similar $\tau_{motor}$ is a vector comprising the torques of the motor axles 4 as seen in "space" of the output side of the robot joint gear. Consequently:

$$\tau_{motor} = r \cdot \tau_{motor\ real}$$

where $\tau_{motor\ real}$ is the real torque of the motor axles (e.g. as measured by sensors) and r the gear ratio of the robot joint gear. This is the notation used throughout this application.

Following assumptions 1-3, firstly the dynamic model as seen from the output side of the robot joint gears of the robot arm becomes [18]:

$$\tau_{joint} = M(q)\ddot{q} + C(q,\dot{q})\dot{q} + G(q) + F_q(\dot{q}) + \tau_{ext} \qquad \text{eq. 7}$$

where $\tau_{joint}$ is a vector comprising the transmission torques $\tau_{joint,i} \ldots \tau_{joint,n}$ of each of the robot joint gears; q is a vector comprising the angular position of the output axles of the robot joint gears; $\dot{q}$ is a vector comprising the first time derivative of the angular position of the output axles of the robot joint gears and thus relates to the angular velocity of the output axles; $\ddot{q}$ is a vector comprising the second time derivative of the angular position of the output axles of the robot joint gears and thus relates to the angular acceleration of the output axles. M(q) is the inertia matrix of the robot arm and indicates the mass moments of inertia of the robot arm as a function of the angular position of the output axles of the robot joint gears. $C(q,\dot{q})\dot{q}$ is the Coriolis and centripetal torques of the robot arm as a function of the angular position and angular velocity of the output axle of the robot joint gears. G(q) is the gravity torques acting on the robot arm as a function of the angular position of the output axles of the robot joint gears.

$F_q(\dot{q})$ is a vector comprising the friction torques acting on the output axles of the robot joint gears. The friction torques acting on the output axle depends on angular velocity of the output axle ($\dot{q}$); however it is to be understood the friction torques acting on the output axle also can depend on other parameters such as temperatures, type of lubricants, loads to robot arm, position/orientation of the robot arm etc. $F_q(\dot{q})$ can for instance be provided as linear or nonlinear functions or lookup tables (LUTs) with interpolation, and $F_q(\dot{q})$ can be defined based on for instance prior knowledge of the robot, experiments, and/or be adaptively updated during robot operation. For instance, the $F_q(\dot{q})$ can be obtained during calibration of the robot joints for instance by measuring the total friction torques of the robot joint gear and assuming that the friction torques act on the motor axle only thus $F_q(\dot{q})=0$. $\tau_{ext}$ is a vector indicating the external torques acting on the output axles of the robot joint gears. The external torques can for instance be provided by external forces and/or torques acting on parts of the robot arm. For instance, if the tool flange of the robot is subject to external forces and/or torques described by $F_{ext}$, the resulting torques at the output axles of the robot joints becomes:

$$\tau_{ext}=J^T(q)F_{ext} \quad \text{eq. 8}$$

where $J^T(q)$ is the transposed manipulator Jacobian of the robot arm and where $F_{ext}$ is a vector describing the direction and magnitude of the external forces and torques in relation to the tool flange of the robot arm.

Secondly, the dynamic model as seen from the input side of the robot joint gears becomes [18]:

$$\tau_{motor}=B\ddot{\Theta}+F_\Theta(\dot{\Theta})+\tau_{joint} \quad \text{eq. 9}$$

where $\tau_{joint}$ is a vector comprising transmission torque $\tau_{joint,i} \ldots \tau_{joint,n}$ of each of the robot joint gears; $\ddot{\Theta}$ is a vector comprising the second time derivative of the angular position of the motor axle of the joint motor and thus relates to the angular acceleration of the motor axle. B is the positive-definite diagonal matrix indicating the mass moments of inertia of the joint motor's rotors. $F_\Theta(\dot{\Theta})$ is a vector comprising the friction torques acting on the motor axles and $\tau_{motor}$ is a vector indicating the torque generated by the joint motors.

$F_\Theta(\dot{\Theta})$ is a vector comprising the friction torques acting on the input axles of the robot joint gears. The friction torques acting on the input axle depends on angular velocity of the input axle ($\dot{\Theta}$); however, it is to be understood the friction torques acting on the input axle also can depend on other parameters such as temperatures, type of lubricants, loads to robot arm, position/orientation of the robot arm etc.

$F_\Theta(\dot{\Theta})$ can for instance be provided as linear or nonlinear functions or lookup tables (LUTs) with interpolation, and $F_\Theta(\dot{\Theta})$ can be defined based on for instance prior knowledge of the robot, experiments, and/or be adaptively updated during robot operation. For instance, $F_\Theta(\dot{\Theta})$ can be obtained for each robot joint by running the robot joint gear at a constant angular velocity for at least one whole revolution of the output axle or any positive integer multiple of a revolution without the robot arm contacting external objects, while obtaining the motor torque of the robot joint motor. Under these conditions the inertia term of the robot arm $M(q)\ddot{q}$ is zero due to the constant angular velocity, the Coriolis and centripetal term $C(q,\dot{q})\dot{q}$ cancels because only one robot joint is moved at the time, and the gravity term $G(q)$ cancels out due to the full rotation of the output axle, and no external torques are provided to the robot arm. Consequently eq. 7 reduces to:

$$\tau_{joint,average}=F_{q,average}(\dot{q}) \quad \text{eq. 10}$$

where $\tau_{joint,average}$ indicates the average joint transmission torque during one revolution of the output axle and $F_{q,average}(\dot{q})$ indicates the friction force acting on the output axle of the robot joint gear during one revolution of output axle. Further, under these conditions the inertia term of the joint motors $B\ddot{\Theta}$ is zero due to the constant velocity. Consequently eq. 9 reduces to:

$$\tau_{motor}=F_\Theta(\dot{\Theta})+\tau_{joint} \quad \text{eq. 11}$$

combining eq. 10 and eq. 11 makes it possible to obtain the friction torques acting on the motor axles as:

$$F_\Theta(\dot{\Theta})=\tau_{motor}-F_{q,average}(\dot{q}) \quad \text{eq. 12}$$

The friction torque $F_\Theta(\dot{\Theta})$ can also be mechanically modeled for instance as a Generalized Maxwell-Slip (GMS) model [19] which is based on three frictional properties
1) a Stribeck curve for constant velocities,
2) a hysteresis function with nonlocal memory in the pre-sliding regime, and
3) a frictional lag in the sliding regime.

The GMS model captures the behavior of hysteresis which often are seen in robot joint gears for instance strain wave gears, where the GMS model can be obtained based on the measured $F_\Theta(\dot{\Theta})$.

Figure 11:
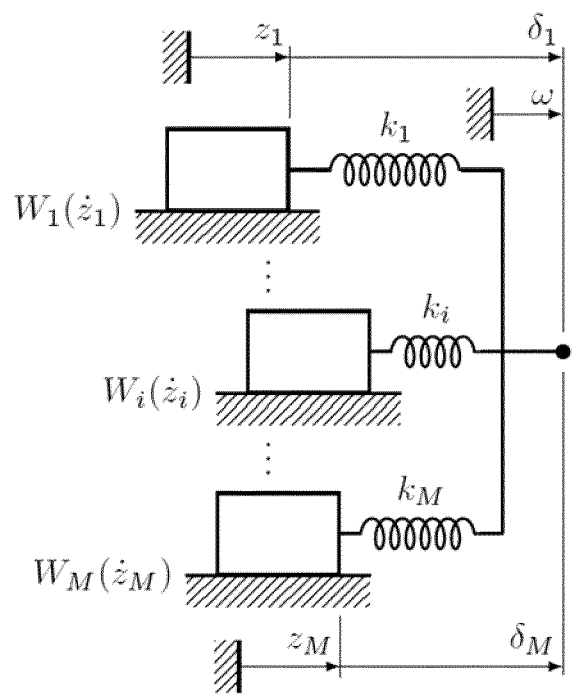
FIG. 11 illustrates a schematic representation of the Generalized Maxwell-Slip friction model.

For single robot joint gear, the GMS model can be visualized as a parallel connection of M massless block-spring models (illustrated in FIG. 11) subject to the same input velocity $\omega=d\theta/dt$. The total friction force is given as the summation of friction forces for each element i, i.e.

$$F_\Theta=\sum_{i=1}^M F_i \quad \text{eq. 13}$$

The dynamics of each elementary model is represented by the equations (10) and (11). If the element is sticking:

$$\frac{dF_i}{dt}=k_i\omega \quad \text{eq. 14}$$

where $k_i$ is the spring stiffness of the $i^{th}$ element. The element remains sticking until $F_i > v_i s(\omega)$ where the fractional parameter v determines the maximum force $F_i$ for each element during sticking. If the element is slipping $$\frac{dF_i}{dt}=\text{sign}(\omega)C\left(v_i+\frac{F_i}{s(\omega)}\right) \quad \text{eq. 15}$$

The attraction parameter c determines how fast the total friction force approaches $s(\omega)$ in sliding.

The Nonlinear Static Map $$s(\omega)=\text{sign}(\omega)(F_C+(F_S-F_C)\cdot e^{-(|\omega|/v_S)^\mu})+F_{V_1}\omega+F_{V_2}\text{sign}(\omega)\omega^2+F_{V_3}\omega^3 \quad \text{eq. 16}$$

captures the Stribeck effect and nonlinear viscous friction, where $F_C$, $F_S$, $v_S$ and $\mu$ are, respectively, the Coulomb friction, the stiction, the Stribeck velocity, and the Stribeck shape factor, and $F_{V_1}$, $F_{V_2}$, $F_{V_3}$ are viscous coefficients of friction.

Typically the robot controller is configured to control the movements/positions of the robot arm by determining the torques generated by the motor axles $\tau_{motor}$ of the robot joint gears based on eq. 7 and eq. 9 and desired angular positions q, angular velocity $\dot{q}$ and/or desired angular accelerations $\ddot{q}$ of the output axles of the robot joint gears. The desired angular positions q, angular velocity $\dot{q}$ and/or desired accelerations $\ddot{q}$ of the output axles of the robot joint gears can for instance be provided via a robot program stored in the memory or via user inputs received through the input device. The angular positions q, angular velocity $\dot{q}$ and/or desired accelerations $\ddot{q}$ of the output axles can be provided directly or as other parameter from which the parameters can be obtained for instance in form of coordinates of the robot tool flange in relation to the robot base or the like. The controller is then configured to control the joint motors by regulating the current through the joint motors.

Step 552 of applying a motor torque to the motor axles of the joint motors can for instance be carried out by the controller instructing the joint motor to apply a motor torque to the motor axles of the robot joint gears. For instance, the controller can be configured to provide motor torques that maintain the robot arm in a static posture, where the motor torques are sufficient to overcome the gravity on the robot arm or by providing motor torques moving parts of the robot. Consequently, the joint motors are driven in order to generate motor torques $\tau_{motor}$ by the motor axles.

In one embodiment the step of applying a motor torque to the motor axle using the joint motor results in movement of at least a part of the robot arm. This can be achieved by driving the joint motors with current that results in rotation of the robot joints whereby at least a part of the robot arm moves. For instance, the robot controller may be configured to apply a motor torque to the joint motors that result in movement of a part of the robot arm upward in relation to gravity and in such situation the applied motor torque is larger than the motor torque needed to compensate for gravity. Also, the robot controller may be configured to apply a motor torque to the joint motors that result in movement of a part of the robot arm downward in relation to gravity and in such situation the applied motor torque is smaller than the motor torque needed to compensate for gravity. However, it is to be understood that any motor torque resulting in movement in any direction of at least a part of the robot arm can be applied. Consequently, both the input axle of the robot joint gears and the output axle of the robot joint gears rotates. The dynamic terms of the dynamic models according to eq. 7 and eq. 9, which depends on the angular velocity $\dot{q}$ of the output axle, the angular acceleration $\ddot{q}$ of the output axle, the angular velocity $\dot{\Theta}$ of the motor axle, and/or the angular acceleration $\ddot{\Theta}$ of the motor axle can be obtained during movement of the robot arm. For instance the angular velocity $\dot{q}$ of the output axle, the angular acceleration $\ddot{q}$ of the output axle, the angular velocity $\dot{\Theta}$ of the motor axle, the angular acceleration $\ddot{\Theta}$ of the motor axle can be obtained as described in paragraphs [0053]-[0054]. This makes it possible to obtain the gear stiffness of the robot joint gear during movement and operation of the robot arm.

The method can comprise an optional step 535 of obtaining the actual motor torque $\tau_{actually}$ provided by the motor axles. The actual motor torques can for instance be obtained by obtaining the current through the joint motors whereby the actual motor torque can be obtained as known in the art of motor control. For instance, if the joint motors are provided as three-phase Permanent Magnet Synchronous Machines (PMSM) with dynamics much faster than that of the manipulator. If the joint motors are operated under their current saturation limit, the motor axle torque can be obtained by:

$$\tau_{actually,motor} = K_\tau I_{motor} \qquad \text{eq. 17}$$

where $\tau_{actually,motor}$ is a vector comprising the actual torque provided by the motor axles of the joint motors (seen in the output space of the robot joint gear), $K_\tau$ is the positive-definite diagonal matrix of torque constants and $I_{motor}$ is a vector comprising the torque-generating (quadrature) current obtained from the phase currents of the joint motors using the Park Transform.

The actual torque of the motor axle can also be obtained by using force/torque sensors such as strain gauges indicating the actual torque of the motor axle. Obtaining the actual torque $\tau_{actually}$ generated by the motor axles provides a more accurate gear stiffness as eventual deviation between the desired motor signal and the actual torque can be eliminated.

Step 554 of obtaining the angular position of the motor axles of the joint motors can be obtained by measuring the angular position of the motor axle for instance by using an encoder such as optical/magnetic encoders as known in the art of robotics. The angular position of the motor axles $\Theta$ can be stored in a memory for later usage for instance in order to store a number of angular positions of the motor axles obtained at different times. The angular position of the motor axles can for instance be used to obtain the angular velocity and/or angular acceleration of the motor axles for instance by differentiation and double differentiation of the angular position with respect to time. The angular velocity of the motor axles and angular acceleration of the motor axles can then be used to obtain the robot joint gear stiffness using the dynamic terms of the dynamic model of the robot arm. Consequently, the gear stiffness of the robot joint gear can be obtained during movement and operation of the robot arm. It is to be understood that the angular velocity of the motor axles and/or angular acceleration other motor axles alternatively can be obtained using sensors/encoders measuring the actual parameters.

Step 556 of obtaining the angular position of the output axle of the robot joint gears can be obtained by measuring the angular position of the output axle for instance by using encoders such as optical/magnetic encoders as known in the art of robotics. The angular position of the output axles q can be stored in a memory for later usage, for instance a number of angular positions of the output axles obtained at different times can be stored in a memory. Alternatively, the angular position of the output axles of the robot joint gears can be obtained as the desired angular position of the output axles upon which the controller is generating the motor torques. This makes it possible to estimate the angle of the output axles in robot joints that does not comprise encoders for measuring the angular position of the output axles. The angular position of the output axle of the robot joint gears can for instance be used to obtain the angular velocity and/or angular acceleration of the output axle of the robot joint gears for instance by differentiation and double differentiation of the angular position with respect to time. The angular velocity of the output axles and angular acceleration of the output axles can then be used to obtain the robot joint gear stiffness using the dynamic terms of the dynamic model of the robot arm. Consequently, the gear stiffness of the robot joint gear can be obtained during movement and operation of the robot arm. It is to be understood that the angular velocity of the output axles and/or angular acceleration of motor axles alternatively can be obtained using sensors/encoders measuring the actual parameters.

Step 560 of determining the gear stiffness of the robot joint gears can be embodied by considering the model of the flexibility of the robot joint illustrated in FIG. 3 and described in paragraphs [0024]-[0028]. The dynamic model of the robot arm can be further specified by replacing $\tau_{joint}$ of eq. 7 and eq. 9 with the right hand side of eq. 2 and thereafter isolating the nonlinear flexibility $\tau_E(\Phi_{joint})$:

$$\tau_E(\Phi_{joint}) = M(q)\ddot{q} + C(q,\dot{q})\dot{q} + G(q) + F_q(\dot{q}) + \tau_{ext} - \tau_D(\dot{\Phi}_{joint}) \qquad \text{eq. 18}$$

$$\tau_E(\Phi_{joint}) = \tau_{motor} - B\ddot{\Theta} - F_\Theta(\dot{\Theta}) - \tau_D(\dot{\Phi}_{joint}) \qquad \text{eq. 19}$$

where $\Phi_{joint}$ is a vector comprising the deflection of each robot joint gear, $\dot{\Phi}_{joint}$ is a vector comprising the first-order time derivative of the deflection of each robot joint and $\tau_D(\dot{\Phi}_{joint})$ is a vector comprising the damping torque for each robot joint gear as a function of the time derivative of the deflection of the robot joints and $\tau_E(\Phi_{joint})$ is a vector comprising the flexibility torque of each of the robot joint gears as a function of the deflection of the robot joint gears.

Step 560 of determining the gear stiffness of the robot joint gears comprise thus a step 562 of obtaining the deflection $\Phi_{joint}$ of the robot joint gears based on the angular position $\Theta$ of the motor axles and the angular position q of the output axles, where the deflection $\Phi_{joint}$ of the robot joint gears can be indicated as the difference between the angular position $\Theta$ of the motor axle and the angular position q of the output axle as indicated by eq. 1. It is to be understood that the deflection alternatively also can be indicated as the difference between the angular position of the output axle and the angular position of the motor axle. Step 560 of determining the gear stiffness of the robot joint gears comprise a step 564 of obtaining a flexibility torque of the robot joint gear at the deflection of the robot joint gear based on at least the angular position of the motor axle, the angular position of the output axle and a dynamic model of said robot arm. The flexibility torque $\tau_E(\Phi_{joint})$ of the robot joint gear at the deflection of the robot joint gear can be obtained based on eq. 18, with the angular position of the motor axles $\Theta$ and the angular position q of the output axles as input variables, as the remaining parts of eq. 18 have been obtained during the initialization and for instance stored the memory. It is noted that $\tau_{ext}$ is zero in situations where no external forces/torques are acting on the robot arm, however if for instance an external force is acting on the robot tool flange the external forces/torques can then be obtained based on eq. 8. Further the contribution from external forces can also be obtained by using force/torques sensors. Additionally, or alternatively $\tau_E(\Phi_{joint})$ can be obtained based on eq. 19 with the angular position of the motor axles $\Theta$, the angular position q of the output axles and motor torques $\tau_{motor}$ by the motor axles as input variables. It is thus to be understood that the motor torques $\tau_{motor}$ by the motor axles can be provided as an additional/optional input to step 564. In the embodiment comprising step 553 the motor torques $\tau_{motor}$ can be replaced by the actual motor torques $\tau_{actually}$ obtained in step 553 when obtaining the gear stiffness of the robot joint gear using eq. 19. The motor torques $\tau_{motor}$ and the actual motor torques $\tau_{actually}$ is indicated in brackets [ ] and ( ) in FIG. 5 in order to illustrate that they can be provided as additional parameters to step 564.

In step 566 the gear stiffness of the robot joint gears can be obtained based on the deflection of the robot joint gear obtained in step 562 and the flexibility torque $\tau_E(\Phi_{joint})$ of the robot joint gear obtained in step 564. Considering the eq. 4, eq. 5 and eq. 6 makes it possible to obtain the gear stiffness as:

$$K_i(\Phi_{joint}) = \frac{\delta \tau_E}{\delta \Phi_{joint}} \approx \frac{\Delta \tau_E}{\Delta \Phi_{joint}} \qquad \text{eq. 20}$$

where $\tau_E(\Phi_{joint})$ can be obtained based on eq. 18 or eq. 19 as described in connection with step 564.

The gear stiffness $k_i(\Phi_{joint})$ obtained by eq. 20 provides can be used to obtain the average gear stiffness between a certain deflection of the robot joint gear and the situation where deflection of the robot joint gear is zero, which is typically when no motor torque is provided to the robot joint gears. In such situation eq. 20 can be simplified to $$K_{i,average}(\Phi_{joint}) = \frac{\tau_E(\Phi_{joint}) - \tau_E(0)}{\Phi_{joint} - 0} = \frac{\tau_E(\Phi_{joint})}{\Phi_{joint}} \qquad \text{eq. 21}$$

Additionally or alternatively the gear stiffness of the robot joint gears can be indicated as the flexibility torque $\tau_E(\Phi_{joint})$, where a high flexibility torque at a given deflection of the robot joint gear indicates a high gear stiffness, as a higher flexibility torque is needed to achieve the deflection of the robot joint gear; reversely a low flexibility torque at a given deflection of the robot joint gear indicates a low gear stiffness as a smaller flexibility torque is needed to achieve the deflection of the robot joint gear. The gear stiffness of the robot joint gears can thus be indicated based eq. 18 and/or eq. 19.

The method can comprise an optional step 570 of comparing the obtained gear stiffness $k_i(\Phi_{joint})$ with prior knowledge of the robot joint gear stiffness $k_{i,limit}(\Phi_{joint})$ and provide a status $S_{joint}$ of the robot joint gears based on the obtained gear stiffness and said prior knowledge of the robot gear stiffness. For instance, the average gear stiffness can be obtained at different times during the life time of the robot and be compared a threshold value of the gear stiffness, where the threshold value has been determined based on knowledge about the evolution of the gear stiffness in relation to wear of the robot joint gear. The status of the robot joint gear can thus be used to indicate the wear of the robot joint gears. Typically, the gear stiffness of a robot joint gears tend to decrease before the robot joint gears breaks, as material is worn off at the gear meshing. Consequently, the controller can be adapted to provide a warning when the gear stiffness reaches a threshold value, whereby the robot joint gear can be sent for repair or replaced before the gear breaks. This makes it possible to avoided failure of the robot joint gear and thereby avoid downtime of the robot arm.

The method can comprise an optional step 580 of controlling the robot arm based on the obtained gear stiffness of the robot joint gears by providing a control signal $\tau_{control}$ indicative of a desired motor torque $\tau_{motor}$ of the motor axle. The desired motor torque $\tau_{motor}$ can for instance be obtained based on the gear stiffness of the robot joint gears by modifying the dynamic model of the robot to include the stiffness of the robot joint gears and then update the dynamic model of the robot based on the gear stiffness obtained in step 560.

FIG. 6 illustrates a flow chart of the method of obtaining the gear stiffness of a robot joint gear of a robot joint of a robot arm. The method is like the method illustrated in FIG. 5 and similar steps have been given the same reference numbers as in FIG. 5 and will not be described further.

In this embodiment the methods comprise a step 665 (illustrated as an arrow) of repeating the following steps:
step 552 of applying a motor torque to the motor axle using the joint motor;
step 554 of obtaining the angular position of the motor axle;
step 556 of obtaining the angular position of the output axle;
step 562 of obtaining the deflection of the robot joint gear based on the angular position of the motor axle and the angular position of the output axle; and
step 564 of obtaining a flexibility torque of the robot joint gear at the deflection of the robot joint gear based on at least the angular position of the motor axle, the angular position of the output axle and a dynamic model the of robot arm.

The steps are repeated a plurality of times and the deflection $\Phi_{joint}$ of the robot gears obtained in step 562 and the flexibility torque of the robot joint gears obtained in step 564 are stored for each repetition. Consequently, a data set comprising a plurality of data points ($\Phi_{joint}$; $\tau_E(\Phi_{joint})$) can be obtained and the flexibility torque of the robot joint gears can be obtained for different deflections of the robot joint gears. During the repetitions motor torque applied to the motor axle of the robot joint gears can be varied in step 552 whereby it is possible to obtain the flexibility torque of the robot joint gears over a range of robot joint gear deflections. This makes it possible to map the flexibility torque of the robot joint gears as a function of the robot joint gear deflection and the gear stiffness of the robot joint gear can be obtained as function of the robot joint gear deflection.

Step 667 is a step of fitting the obtained data points comprising the flexibility torques of the robot joint gears and the corresponding robot joint gear deflection with a mathematical function. For instance, the obtained data points for a single robot joint can be fitted to polynomial function having a linearly parametrized polynomial basis:

$$\tau_{E,i}(\Phi_{joint,i}) = \Psi^T(\Phi_{joint,i})\alpha_i \qquad \text{eq. 22}$$

where $\Psi^T(\Phi_{joint})$ is the linear polynomial basis of the deflection variable $\Phi_{joint}$, $\alpha_i$ is a vector comprising the constants for polynomial basis functions of the $i^{th}$ robot joint. Based on the symmetry assumptions in eq. 5 and eq. 6 the regressor $\Psi^T(\Phi_{joint})$ can be specified to contain only odd powers of $\Phi_{joint}$, thus:

$$\Psi^T(\Phi_{joint}) = \Phi_{joint}^{2p-1}, \, p=1,2,\ldots,P \qquad \text{eq. 23}$$

In summation form the polynomial function can be written as:

$$\tau_{E,i}(\Phi_{joint,i}) = \sum_{p=1}^{P} \alpha_{p,i} \cdot \Phi_{joint,i}^{2p-1} \qquad \text{eq. 24}$$

where $\alpha_{p,i}$ is a vector comprising the constants for the polynomial basis functions for the $i^{th}$ robot joint. In a robot arm comprising a plurality of robot joints a polynomial function and corresponding vector of constants can be provided for each robot joint.

As described in paragraph [0027] and stated by eq. 4 the stiffness of the robot joint gear can then be determined as the change of flexibility torque of the robot joint gears with respect to the robot joint gear deflection. The method can comprise a step 668 of obtaining the gear stiffness of the robot joint robot by obtaining the slope of the flexibility torque with respect to the deflection of said robot joint gear. For instance, the slope can be determined between at least two of the data points indicated by eq. 20 and by eq. 21 for the situation where no flexibility torque exists at a deflection of zero. The slope can also be indicated by differentiation of the mathematical function fitted to the data points. In case of a polynomial function this corresponds to differentiation of eq. 24

$$K_i(\Phi_{joint}) = \frac{\delta\tau_E(\Phi_{joint,i})}{\delta\Phi_{joint,i}} = \sum_{p=1}^{P}(2p-1)\alpha_{p,i} \cdot \Phi_{joint,i}^{2p-2} \qquad \text{eq. 25}$$

The method of obtaining the gear stiffness of the robot joint gears of a robot joint have been demonstrated on a robot arm by obtaining the flexibility torque of a single robot joint gear as a function of robot joint gear deflection using both a method according to the present invention and an alternative method. The experiments have been performed using a UR5e robot arm provided by Universal Robots and the results are discussed in the following paragraphs.

Figure 7:
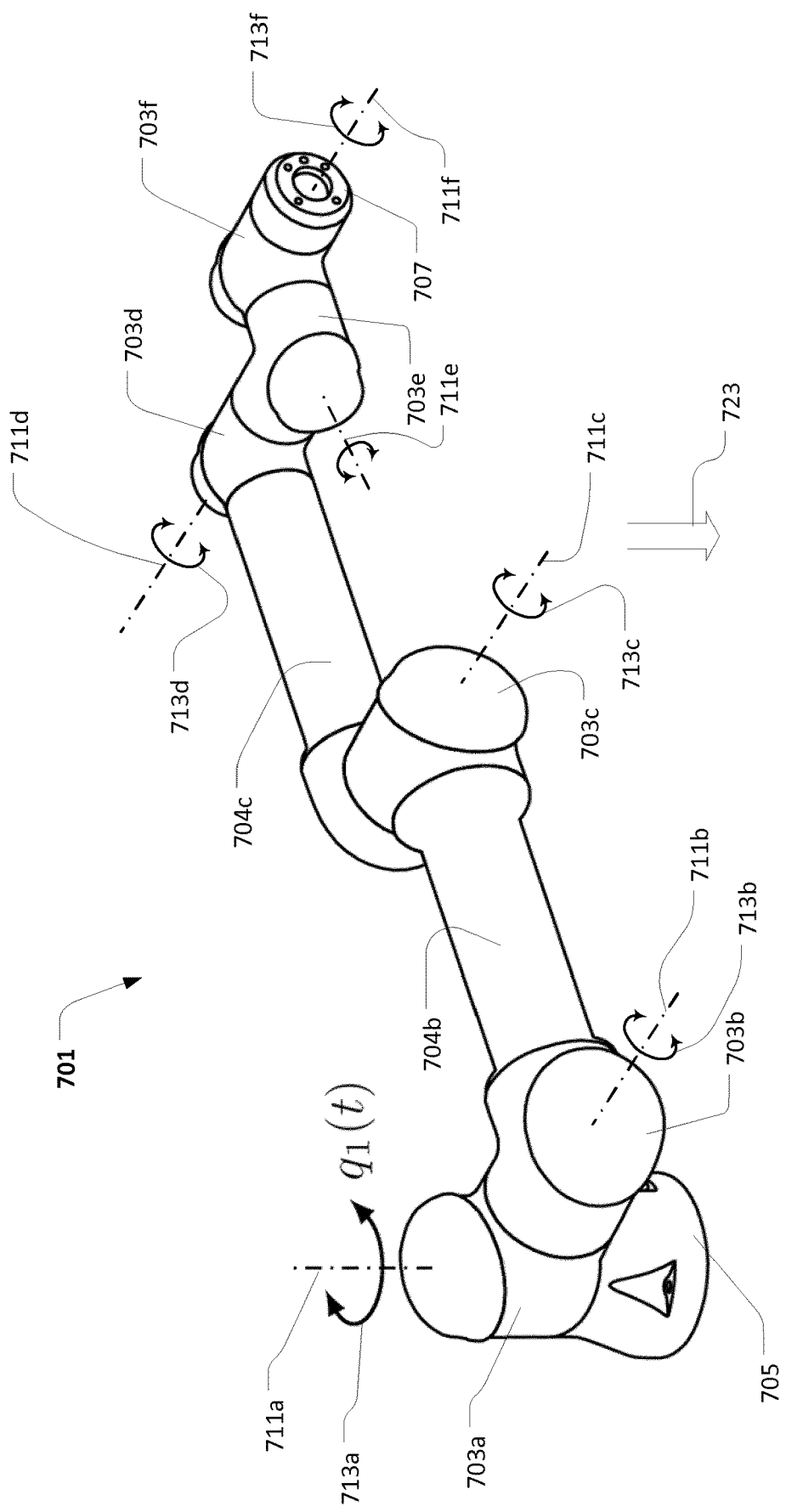
FIG. 7 illustrates a robot arm in a pose used in an experimental analysis of the method according to the present invention.

FIG. 7 illustrates the robot arm 701 in configuration used in the experimental analysis. The robot arm is a six-axis robot comprising robot base 705 carrying the robot arm. A base joint 703a is directly connected to the shoulder joint 703b and is configured to rotate the robot arm around a base axis 711a (illustrated by a dashed dotted line) as illustrated by rotation arrow 713a. The shoulder joint 703b is connected an elbow joint 703c via a robot link 704b and is configured to rotate the robot arm around a shoulder axis 711b as illustrated by rotation arrow 713b. The elbow joint 703c connected to a first wrist joint 703d via a robot link 704c and is configured to rotate the robot arm around an elbow axis 711c as illustrated by rotation arrow 713c. The first wrist joint 703d connected to a second wrist joint 703e and is configured to rotate the robot arm around a first wrist axis 711d as illustrated by rotation arrow 713d. The second wrist joint 703e is connected to a robot tool joint 703f and is configured to rotate the robot arm around a second wrist axis 711e as illustrate by rotation arrow 713e. The robot tool joint 703f comprising the robot tool flange 707, which is rotatable around a tool axis 711f as illustrated by rotation arrow 713f.

During the experiments the robot arm 701 is arranged in a pose where the base axis 711A is parallel with the direction of gravity 723 and the shoulder axis 711b, the elbow axis 711c, the first wrist axis 711d, the second wrist axis 711e and the tool axis 711b are perpendicular to the direction of gravity 723. The base joint 703a is the only joint which is rotated during the experiment and the shoulder joint 703b, the elbow joint 703c, the first wrist joint 703d, the second wrist joint 703e and the tool joint 703b are thus fixed during the experiments.

The gear stiffness of the robot joint gear of the base joint 703a is obtained in the experiments. Firstly, the friction and the stiffness characteristics for the base joint 703a of the UR5e Robot arm is obtained using an alternative method.

Figure 8:
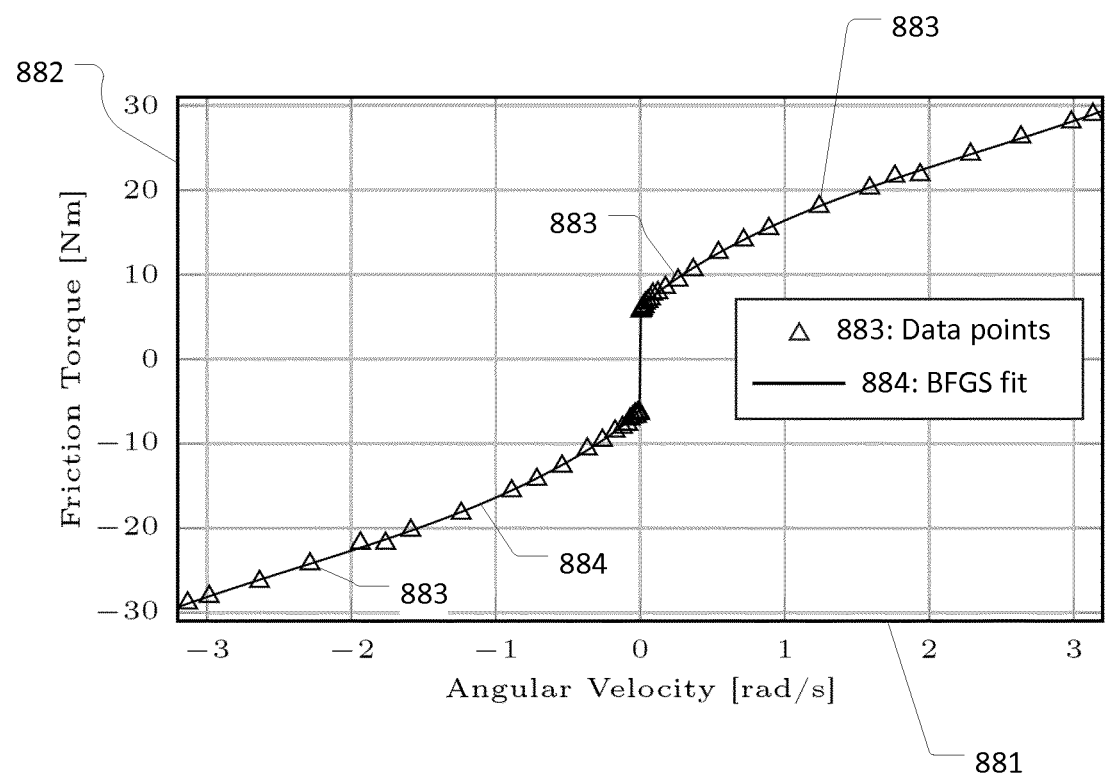
FIG. 8 illustrates a friction torque/velocity map obtained by imposing different signals of constant velocity on the base joint of a robot arm, while measuring the joint motor current.

The steady-state friction torque is identified by imposing different signals of constant velocity on the base joint while measuring the robot joint current. For constant velocity eq. 7, eq. 9 and eq. 17 yield $F_\theta + F_q = K_\tau I$. The steady-state friction torque is illustrated in FIG. 8. FIG. 8 illustrates a graph of the measured friction torques at varying angular velocity of the motor axle, where the horizontal axis indicates the angular velocity 881 of the motor axle and the vertical axis indicates the friction torque 882. The experimental data points comprising an angular velocity and corresponding friction torque 883 are illustrated as triangles. The parameters in eq. 16 are fitted to the data points using a Quasi-Newton method with a cubic line search procedure and updating the Hessian matrix approximation by the Broyden-Fletcher-Goldfarb-Shanno (BFGS) method and the fit have been illustrated by solid line 884. The fit of to the data points is 98.6% using a normalized Root Mean Squared Error (NRMSE) method.

Figure 9:
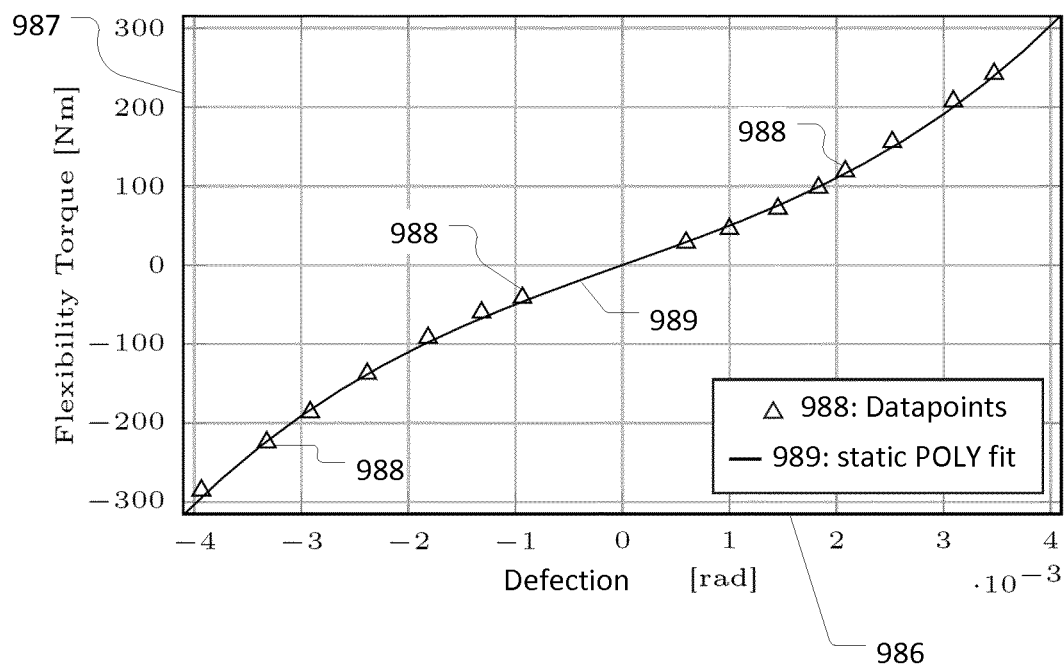
FIG. 9 illustrates a flexibility torque/transmission deformation map obtained by imposing a set of known torques to the tool flange of a robot arm using a force gage and measuring the deformation as the difference between absolute joint encoder readings at each side of the robot joint gear.

The flexibility torque of the robot joint gear of the base joint is obtained in a static setting by locking the input axle (motor axle) of the robot joint gear and imposing a set of known torques on the output axle using a Sauter FH-S 500 digital force gage while measuring the deformation of the robot joint gear using the output and input encoders of the robot. FIG. 9 illustrates a graph where the vertical axis indicates flexibility torque of the robot joint gear 987 and the horizontal axis indicated the deflection of the robot joint gear 986. The experimental data points comprise a robot joint deflection and corresponding flexibility torque and are illustrated as triangles 988. The data points have been fitted to a linearly parametrized polynomial basis 989 (Static POLY fit) as described in eq. 24 with P=2 and is illustrated as a solid line. The fit of the polynomial bases to the data points is 96.9% using a normalized Root Mean Squared Error (NRMSE) method.

Figure 10:
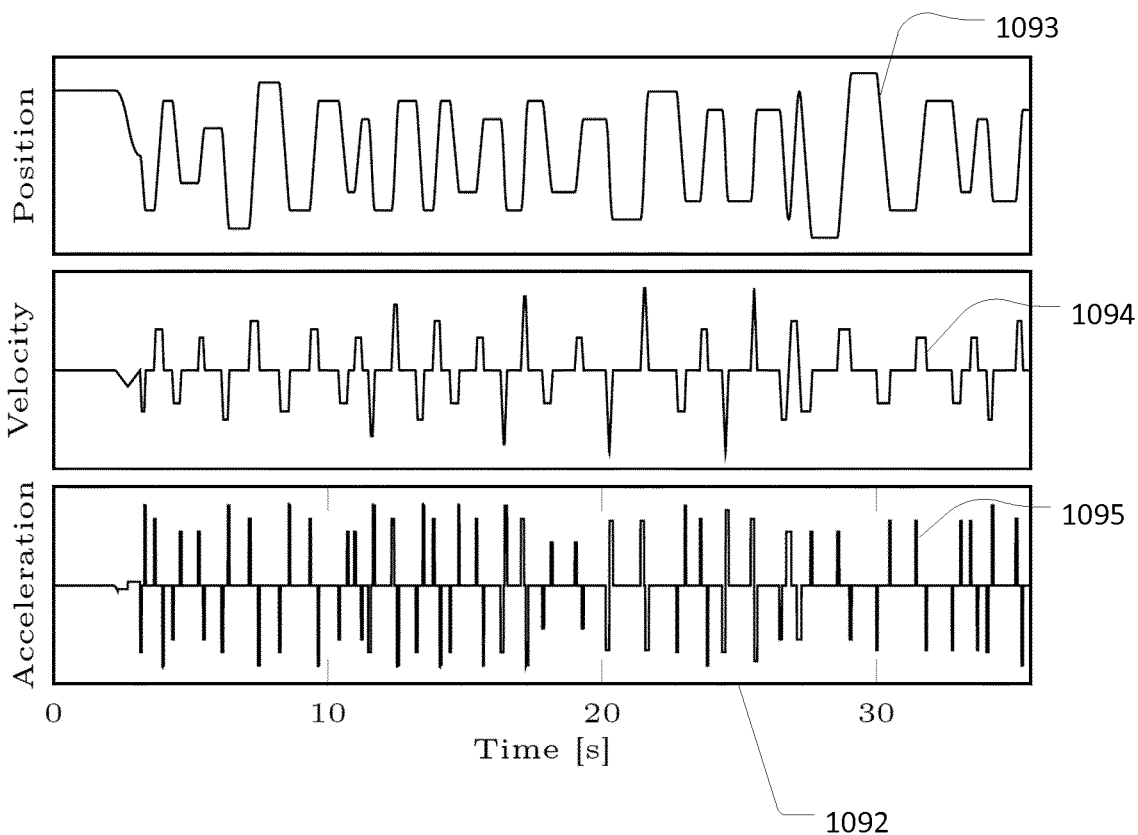
FIG. 10 illustrates angular position, angular velocity and angular acceleration of the base joint of the robot arm used in the experimental analysis.

The flexibility torque of the robot joint gear of the base joint is obtained dynamically based on the method according to the present invention by rotating the base joint according to the bang-coast-bang joint space trajectory generated with randomly generated waiting times and angular positions, velocities, and accelerations in intervals ranging from 30% to 100% of the maximum allowed values. FIG. 10 illustrates graphs of the joint space trajectory used to drive the base joint of the robot, where the horizontal axis 1093 indicates time in seconds; graph 1093 illustrates the angular position of the base joint output axle; graph 1094 illustrates the angular velocity of the base joint output axle; graph 1095 illustrates the angular acceleration of the base joint output axle.

During the experiment the angular position of the output axle of the base joint, the angular position of motor axle of base joint, and the current trough the base joint motor are measured while the robot arm moves according the joint space trajectory illustrated in FIG. 10. The flexible torque is the obtained based on the measured angular position of the output axle of the base joint, the angular position of motor axle of base joint and the current trough the base joint motor using eq. 19 and eq. 17.

Figure 12:
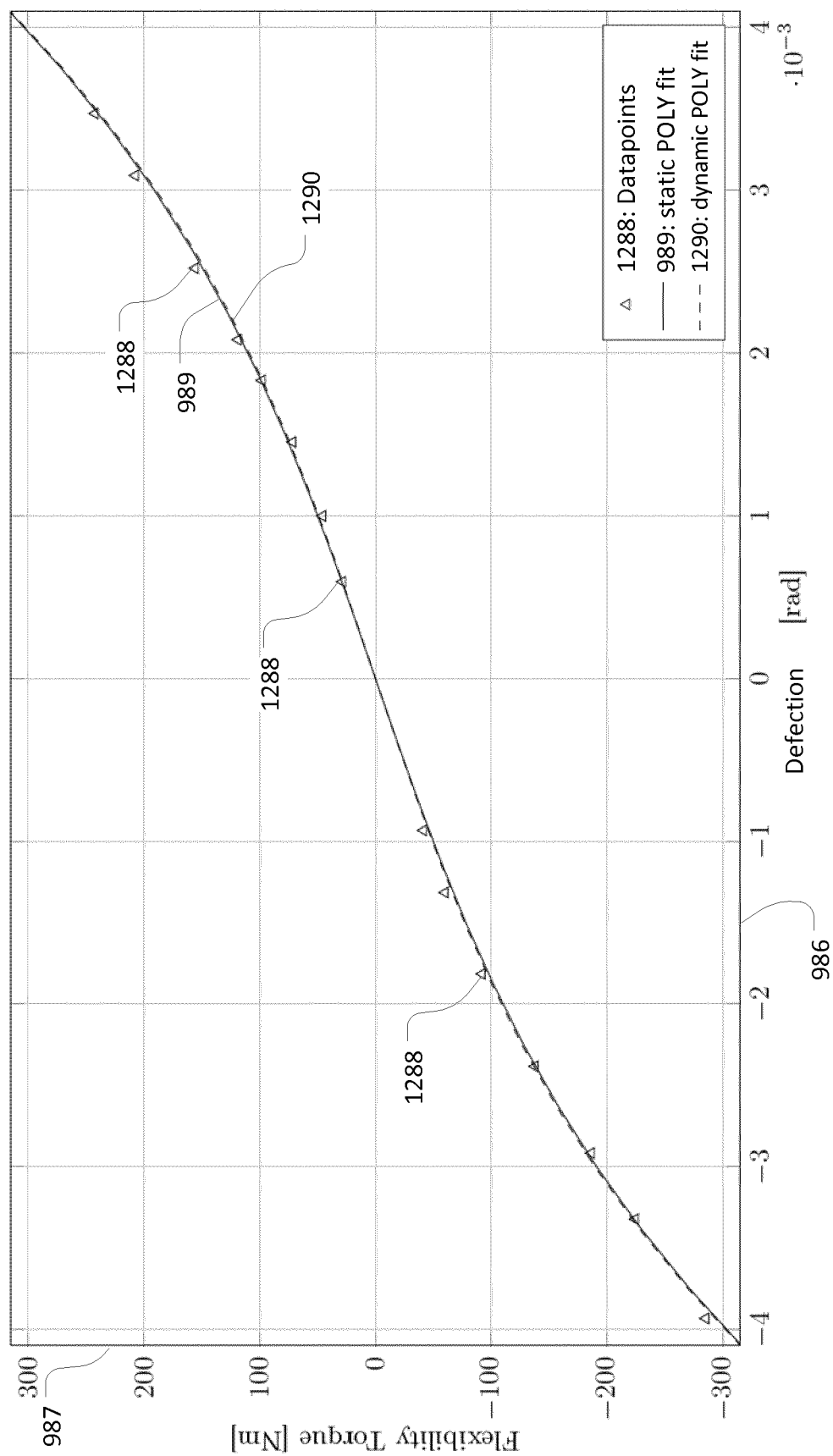
FIG. 12 illustrates a flexibility torque/transmission deformation map obtained by the method according to the present invention.

FIG. 12 illustrates a graph where the vertical axis indicates flexibility torque of the robot joint gear 987 and the horizontal axis indicated the deflection of the robot joint gear 986. The experimental data points comprise a robot joint deflection and corresponding flexibility torque and are illustrated as triangles 1288. The experimental data points have been fitted to linearly parametrized polynomial basis (dynamic POLY fit 1290 illustrated in dashed line) with P=2 using a Recursive Lease Squares (RLS) approach [20] as described in the next paragraph. The fit of the polynomial bases to the data points is 96.7% using a normalized Root Mean Squared Error (NRMSE) method.

Estimating time-varying parameters with the Recursive Least Squares (RLS) approach is obtained by incorporating a forgetting factor discounting past data. In the present example, the incoming information (the transmission deformation) is nonuniformly distributed over the parameter space. Tracking can only happen in some direction if there is an excitation in that same direction, hence the estimation algorithm tracks time-varying parameters only within the excited subspace. In particular, inspired by the results in [21], by a suitable notion of excitation subspace, the parameter vector in eq. 22 is estimated by the procedure:

$$\varepsilon(k) = \tau_E(k) - \Psi^T(k)\hat{\alpha}(k-1) \quad \text{eq. 26}$$

$$r(k) = \Psi^T(k)P(k-1)\Psi(k) \quad \text{eq. 27}$$

$$L(k) = \frac{P(k-1)\Psi(k)}{1 + r(k)} \quad \text{eq. 28}$$

$$\hat{\alpha}(k) = \hat{\alpha}(k-1) + L(k)\varepsilon(k) \quad \text{eq. 29}$$

$$\beta(k) = \begin{cases} \mu - \frac{1-\mu}{r(k)}, \mu \in [0;1] & \text{if } r(k) > 0 \\ 1 & \text{if } r(k) = 0 \end{cases} \quad \text{eq. 30}$$

$$P(k) = P(k-1) - \frac{P(k-1)\Psi(k)\Psi^T(k)P(k-1)}{\beta(k)^{-1} + r(k)} + \delta I \quad \text{eq. 31}$$

where $\delta > 0$ enforces an increment of the covariance matrix P improving the algorithm alertness. More alertness is achieved by decreasing $\mu$ at the price of an increased sensitivity to disturbances. By setting $\mu=1$ and $\delta=0$, eq. 31 reduces to the standard RLS algorithm.

The fit of the polynomial bases (static POLY fit 989) of the flexible torque obtained statically as descried in paragraph [0063] have also been included in the FIG. 12. There is very good alignment between the flexibility torque obtained by the two methods. Thus, it is possible to obtain the flexibility torque and/or stiffness of the robot joint gear based on the method according to the present invention under dynamic conditions where the output axle of the robot joint gear rotates. For instance, by obtaining the angular position of the input axle, the angular position of the output axle and the motor torque applied to the input axle. Where the motor torque applied to the input axle for instance can be obtained based on the phase currents through the coils of the joint motors (provided as PMSM).

Figure 13:
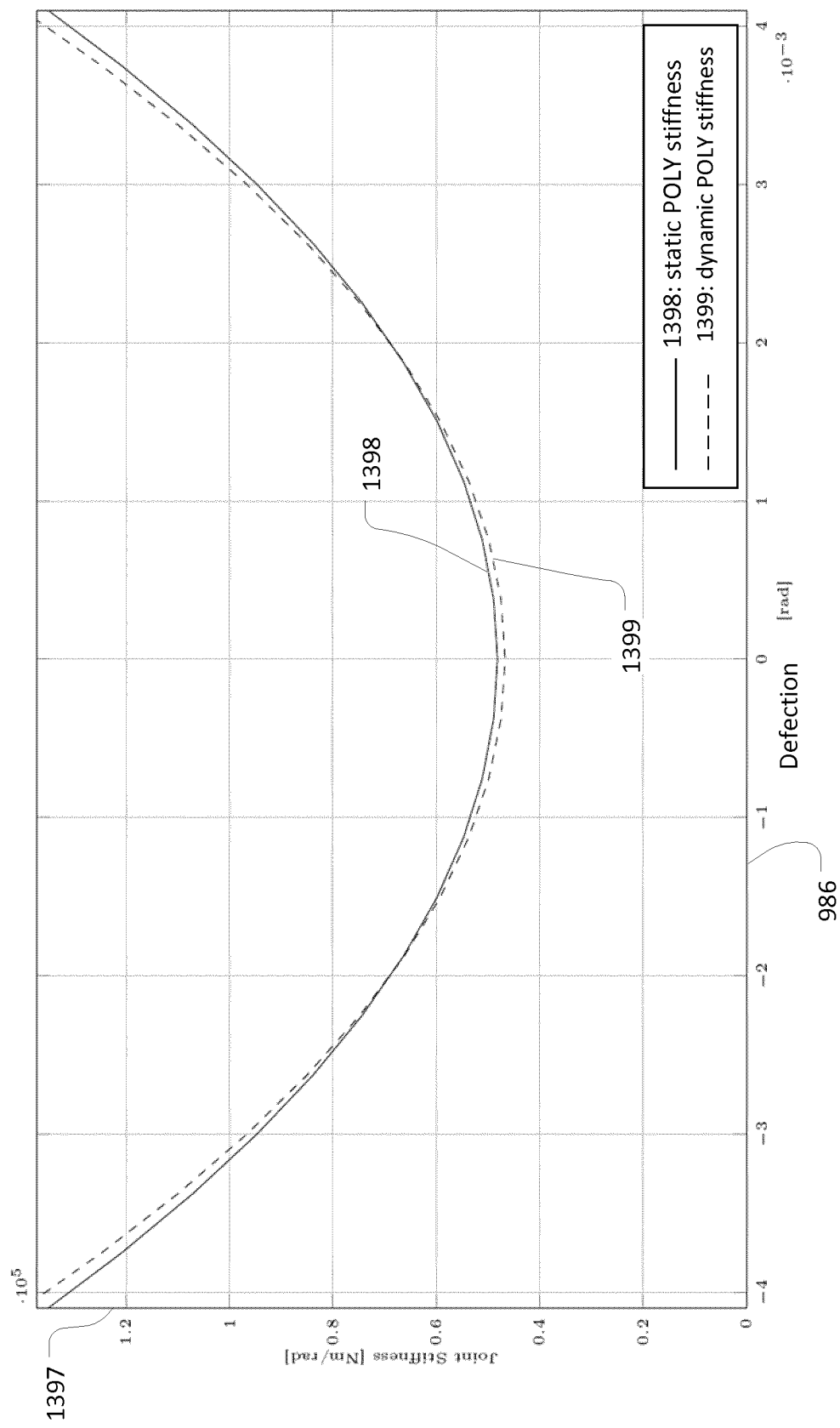
FIG. 13 illustrates gear stiffness of the robot joint gear obtained in the experimental analysis.

FIG. 13 illustrates the obtained joint stiffness obtained by differentiation of the static POLY fit 989 and dynamic POLY fit graphs 1290 in FIG. 12. The vertical axis indicates gear stiffness of the robot joint gear 1397 and the horizontal axis indicated the deflection of the robot joint gear 986. The gear stiffness as obtained via the static measurements illustrated as solid line 1398 (static POLY stiffness) and is obtained by differentiation of the linearly parametrized polynomial basis 989 with respect the robot joint deflection. The gear stiffness as obtained via the dynamic measurements illustrated as dashed line 1397 (dynamic POLY stiffness) and is obtained by differentiation of the linearly parametrized polynomial basis 1290 with respect the robot joint deflection. The variations of gear stiffness as function of the robot joint deflection obtained by the two methods are very good aligned.

The present invention makes it thus possible to obtain the flexibility torque and the gear stiffness of the robot joint gears of a robot arm online during ordinary usage of the robot arm, where the robot arm typically performs a number of movements for instance in connection with a production setup.

| BRIEF DESCRIPTION OF FIGUR REFERENCES | |
| --- | --- |
| 101 | robot arm |
| 103a-103f, 203, 303, 403i; 403i + 1; 401n | robot joint |
| 104b, 104c, 104d, 304i; 304i − 1 | robot link |
| 105 | robot base |
| 107 | robot tool flange |
| 209, 309 | joint motor |
| 111a-111f, 211 | axis of rotation |
| 113a-113f:, 213 | rotation arrow |
| 115, 415 | robot controller |
| 117 | interface device |
| 119 | display |
| 121 | input device |
| 123 | direction of gravity |
| 225, 325i | motor axle |

-continued

| BRIEF DESCRIPTION OF FIGUR REFERENCES | |
|---|---|
| 326 | spring connecting input side and output side |
| 227, 327i | output axle |
| 328 | damper connecting input side and output side |
| 229, 329i | robot joint gear |
| 231 | output flange |
| 233, 433i; 433i + 1; 433n | motor control signal |
| 235 | output encoder |
| 236, 436i; 436i + 1; 436n | output encoder signal |
| 237 | motor encoder |
| 238, 438i; 438i + 1; 438n | output encoder signal |
| 239 | encoder wheel |
| 241 | motor torque sensor |
| 242 | motor torque signal |
| 443 | Processor |
| 445 | memory |
| 550 | Initializing |
| 552 | Apply motor torque to motor axle |
| 653 | obtain actual motor torque |
| 554 | obtain motor axle position |
| 556 | obtain output axle position |
| 560 | obtain stiffness of joint gear |
| 562 | obtain deflection of robot joint gears |
| 564 | Obtain flexibility torque of robot joint gears |
| 665 | Repeat |
| 566, 666 | determine gear stiffness |
| 667 | Fit data points with mathematical function |
| 668 | determine slope of fit |
| 570 | compare gear stiffness |
| 580 | Control robot based on gear stiffness |
| 881 | Angular velocity of motor axle |
| 882 | friction torque |
| 883 | data points comprising an angular velocity and corresponding friction torque |
| 884 | BRGS fit |
| 986 | flexibility torque of the robot joint gear |
| 987 | deflection of the robot joint gear |
| 988, 1288 | data points comprise a robot joint deflection and corresponding flexibility torque |
| 989 | static POLY fit |
| 1290 | dynamic POLY fit |
| 1092 | time |
| 1093 | angular position of base joint output axle |
| 1094 | angular velocity of base joint output axle |
| 1095 | angular acceleration of base joint output axle |
| 1397 | gear stiffness of robot joint gear |
| 1398 | static POLY stiffness |
| 1399 | dynamic POLY stiffness |

REFERENCES

[1] T. W. Nye, "Harmonic Drives: Determining Wear Life Based on Stiffness Considerations," in Proc. of the International Power Transmission and Gearing Conference, Chicago, Apr. 25-28, 1989.

[2] M. R. Johnson et al., "Life Test Failure of Harmonic Gears in a Two-Axis Gimbal for the Mars Reconnaissance Orbiter Spacecraft," Proceedings of the 38th Aerospace Mechanisms Symposium, Langley Research Center, May 17-19, 2006.

[3] J. Mobley and J. Parker, "Harmonic Drive™ Gear Material Selection and Life Testing," Proceedings of the 41th Aerospace Mechanisms Symposium, Jet Propulsion Laboratory, May 16-18, 2012.

[4] A. Albu-Schäffer and G. Hirzinger, "Parameter identification and passivity based joint control for a 7DOF torque controlled light weight robot," in Proc. of IEEE International Conference on Robotics & Automation (ICRA), Seoul, Korea, May 21-26, 2001, pp. 2852-2858.

[5] M. T. Pham et al., "Identification of joint stiffness with bandpass filtering," in Proc. of IEEE International Conference on Robotics & Automation (ICRA), Seoul, Korea, May 21-26, 2001, pp. 2867-2872.

[6] M. Östring et al., "Closed-loop identification of an industrial robot containing flexibilities," in Control Engineering Practice, vol. 11, 2003, pp. 291-300.

[7] M. Gautier et al., "Dynamic Identification of flexible joint manipulators with an efficient closed loop output error method based on motor torque output data," in IEEE International Conference on Robotics and Automation (ICRA), Karlsruhe, Germany, May 6-10, 2013, pp. 2949-2955. [8] C. Dumas et al., "Joint stiffness identification of six-revolute industrial serial robots," in Robotics and Computer-Integrated Manufacturing, vol. 27, 2011, pp. 881-888.

[9] A. Klimchick and A. Pashkevich, "Robotic manipulators with double encoders: accuracy improvement based on advanced stiffness modeling and intelligent control," in IFAC PapersOnLine, vol. 51, no. 11, 2018, pp. 740-745.

[10] A. Jubien et al., "Joint Stiffness Identification of a Heavy Kuka Robot with a Low-cost Clamped End-effector Procedure," in Proc. Of International Conference on Informatics in Control, Automation and Robotics (ICINCO), Vienna, Austria, Sep. 1-3, 2014, pp. 585-591.

[11] A. Jafari et al., "AwAS-II: A new Actuator with Adjustable Stiffness based on the novel principle of adaptable pivot point and variable lever ratio," in Proc. of IEEE International Conference on Robotics & Automation (ICRA), Shanghai, China, May 9-13, 2011, pp. 4638-4643.

[12] M. Grebenstein et al., "The DLR Hand Arm System," in Proc. Of IEEE International Conference on Robotics & Automation (ICRA), Shanghai, China, May 9-13, 2011, pp. 3175-3182.

[13] F. Flacco and A. De Luca, "Residual-based Stiffness Estimation in Robots with Flexible Transmissions," in Proc. of IEEE International Conference on Robotics & Automation (ICRA), Shanghai, China, May 9-13, 2011, pp. 5541-5547.

[14] F. Flacco and A. De Luca, "Robust Estimation of Variable Stiffness in Flexible Joints," in Proc. of IEEE/RSJ International Conference on Intelligent Robots and Systems, San Francisco, CA, USA, Sep. 25-30, 2011, pp. 4026-4033.

[15] F. Flacco and A. De Luca, "A Pure Signal-Based Stiffness Estimation for VSA Devices," in Proc. of IEEE International Conference on Robotics & Automation (ICRA), Hong Kong, China, May 31-Jun. 7, 2014, pp. 2418-2423.

[16] T. Menard et al., "A real time robust observer for an Agonist-Antagonist Variable Stiffness Actuator," in Proc. of IEEE International Conference on Robotics & Automation (ICRA), Karlsruhe, Germany, May 6-10, 2013, pp. 3988-3993.

[17] A. Cirillo et al., "A mechatronic approach for robust stiffness estimation of variable stiffness actuators," in IEEE/ASME International Conference on Advanced Intelligent Mechatronics, Wollongong, Australia, Jul. 9-12, 2013, pp. 399-404.

[18] M. W. Spong, "Modeling and Control of Elastic Joint Robots," Journal of Dynamic Systems, Measurement, and Control, vol. 109, no. 4, 1987, pp. 310-319.

[19] V. Lampaert et al., A Generalized Maxwell-Slip Friction Model appropriate for Control Purposes," in IEEE International Conference for Physics and Control, St. Petersburg, Russia, Proceedings, pp. 1170-1177, 2003.

[20] S. Bittanti et al., "Recursive Least-Squares Identification Algorithms with Incomplete Excitation: Convergence Analysis and Application to Adaptive Control," IEEE Trans. Automatic Control, vol. 35, pp. 1371-1373, 1990.

[21] S. Bittanti et al., "Convergence and Exponential Convergence of Identification Algorithms with Directional Forgetting Factor," Automatica, Vol. 26, No. 5, pp. 929-932, 1990.

The invention claimed is:

1. A method of obtaining a stiffness of a gear of a joint on a robotic arm, where the joint is connectable to at least one other joint on the robotic arm, where the joint comprises a motor having a motor axle, where the motor axle is configured to rotate an output axle through the gear, and where the method comprises:
  applying torque to the motor axle using the motor;
  obtaining an angular position of the motor axle;
  obtaining an angular position of the output axle,
  obtaining a deflection of the gear based on the angular position of the motor axle and the angular position of the output axle;
  obtaining a flexibility torque of the gear at the deflection of the gear based on at least the angular position of the motor axle, the angular position of the output axle, and a dynamic model of the robotic arm, where the dynamic model defines a relationship between forces acting on the robotic arm and resulting accelerations of the robotic arm;
  performing operations repetitively, the operations comprising:
    applying a new torque to the motor axle using the motor;
    obtaining a new angular position of the motor axle;
    obtaining a new angular position of the output axle;
    obtaining a new deflection of the gear based on the new angular position of the motor axle and the new angular position of the output axle; and
    obtaining a new flexibility torque of the gear at the new deflection of the gear based on at least the new angular position of the motor axle, the new angular position of the output axle, and the dynamic model;
  storing each deflection of the gear and each flexibility torque of the gear at a corresponding deflection of the gear;
  fitting, to a mathematical function, the flexibility torques and deflections of the gear that were stored, where the mathematical function comprises a polynomial function that is based on a recursive least squares estimation; and
  determining the stiffness of the gear based on the mathematical function.

2. The method of claim 1, wherein applying the torque to the motor axle results in movement of at least a part of the robotic arm.

3. The method of claim 1, further comprising:
  comparing the stiffness of the gear with to prior knowledge of the stiffness of gear; and
  providing a status of the gear based on a result of the comparing.

4. The method of claim 1, wherein the dynamic model comprises information modeling a parallel spring and damper coupling between the motor axle and the output axle.

5. The method of claim 1, where the robotic arm comprises joints including the joint comprising the gear, where a combination of the joints are for connecting a base and a tool flange, and wherein the method further comprises:
  controlling the joint based on the dynamic model and the stiffness of the gear.

6. The method of claim 5, further comprising:
  modifying the dynamic model based on the stiffness of the gear.

7. A method of obtaining a stiffness of a gear of a joint on a robotic arm, where the joint is connectable to at least one other joint on the robotic arm, where the joint comprises a motor having a motor axle, where the motor axle is configured to rotate an output axle through the gear, and where the method comprises:
  applying torque to the motor axle using the motor;
  obtaining an angular position of the motor axle;
  obtaining an angular position of the output axle;
  obtaining a deflection of the gear based on the angular position of the motor axle and the angular position of the output axle;
  obtaining a flexibility torque of the gear at the deflection of the gear based on at least the angular position of the motor axle, the angular position of the output axle, and a dynamic model, where the dynamic model defines a relationship between forces acting on the robotic arm and resulting accelerations of the robotic arm;
  performing operations repetitively, the operations comprising:
    applying a new torque to the motor axle using the motor;
    obtaining a new angular position of the motor axle;
    obtaining a new angular position of the output axle;
    obtaining a new deflection of the gear based on the new angular position of the motor axle and the new angular position of the output axle; and
    obtaining a new flexibility torque of the gear at the new deflection of the gear based on at least the new angular position of the motor axle, the new angular position of the output axle, and the dynamic model;
  storing each deflection of the gear and each flexibility torque of the gear at a corresponding deflection of the gear;
  fitting, to a mathematical function, the flexibility torques and the deflections of the gear that were stored; and
  determining the stiffness of the gear is based on a slope of flexibility torque relative to the deflection of the gear, the slope being based on the mathematical function.

8. The method of claim 7, wherein applying the torque to the motor axle results in movement of at least a part of the robotic arm.

9. The method of claim 7, further comprising:
  comparing the stiffness of the gear with to prior knowledge of the stiffness of gear; and
  providing a status of the gear based on a result of the comparing.

10. The method of claim 7, wherein the dynamic model comprises information modeling a parallel spring and damper coupling between the motor axle and the output axle.

11. The method of claim 7, where the robotic arm comprises joints including the joint comprising the gear, where a combination of the joints are for connecting a base and a tool flange, and wherein the method further comprises:
  controlling the joint based on the dynamic model and the stiffness of the gear.

12. The method of claim 11, further comprising:
modifying the dynamic model based on the stiffness of the gear.

13. A method of obtaining a stiffness of a gear of a joint on a robotic arm, where the joint is connectable to at least one other joint on the robotic arm, where the joint comprises a motor having a motor axle, where the motor axle is configured to rotate an output axle through the gear, and where the method comprises:
  applying torque to the motor axle using the motor, where applying the torque to the motor axle results in rotation of the motor axle and the output axle;
  obtaining an angular position of the motor axle;
  obtaining an angular position of the output axle;
  obtaining a deflection of the gear based on the angular position of the motor axle and the angular position of the output axle;
  obtaining a flexibility torque of the gear at the deflection of the gear based on at least the angular position of the motor axle, the angular position of the output axle, and a dynamic model, where the dynamic model defines a relationship between forces acting on the robotic arm and resulting accelerations of the robotic arm;
  fitting, to a mathematical function, the flexibility torque and the deflection of the gear that were obtained, where the mathematical function comprises a polynomial function that is based on a recursive least squares estimation; and
  determining the stiffness of the gear is based on a slope that is based on the mathematical function.

14. The method of claim 13, wherein applying the torque to the motor axle results in movement of at least a part of the robotic arm.

15. The method of claim 13, further comprising:
repeating operations comprising:
  applying a new torque to the motor axle using the motor;
  obtaining a new angular position of the motor axle;
  obtaining a new angular position of the output axle;
  obtaining a new deflection of the gear based on the angular position of the motor axle and the angular position of the output axle; and
  obtaining a new flexibility torque of the gear at the new deflection of the gear based on at least the new angular position of the motor axle, the new angular position of the output axle, and the dynamic model; and
for each repetition of the operations, storing the deflection of the gear and the flexibility torque of the gear at the deflection of the gear;
wherein each deflection of the gear and each flexibility torque of the gear is fit to the mathematical function.

16. The method of claim 15, further comprising:
comparing the stiffness of the gear to prior knowledge of the stiffness of gear; and
providing a status of the gear based on a result of the comparing.

17. The method of claim 13, where the robotic arm comprises joints including the joint comprising the gear, where a combination of the joints are for connecting a base and a tool flange, and wherein the method further comprises:
controlling the joint based on the dynamic model and the stiffness of the gear.

18. The method of claim 17, further comprising:
modifying the dynamic model based on the stiffness of the gear.

* * * * *